United States Patent
Oh et al.

(10) Patent No.: US 12,443,826 B2
(45) Date of Patent: Oct. 14, 2025

(54) SPIKE NEURAL NETWORK CIRCUIT

(71) Applicant: ELECTRONICS AND TELECOMMUNICATIONS RESEARCH INSTITUTE, Daejeon (KR)

(72) Inventors: Kwang Il Oh, Daejeon (KR); Tae Wook Kang, Daejeon (KR); Sung Eun Kim, Daejeon (KR); Hyuk Kim, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 807 days.

(21) Appl. No.: 17/829,021

(22) Filed: May 31, 2022

(65) Prior Publication Data

US 2022/0391669 A1    Dec. 8, 2022

(30) Foreign Application Priority Data

Jun. 8, 2021    (KR) .................. 10-2021-0074329

(51) Int. Cl.
| | | |
|---|---|---|
| *G06N 3/04* | (2023.01) | |
| *G06N 3/049* | (2023.01) | |
| *G06N 3/06* | (2006.01) | |
| *G06N 3/065* | (2023.01) | |

(52) U.S. Cl.
CPC ............ *G06N 3/049* (2013.01); *G06N 3/065* (2023.01)

(58) Field of Classification Search
CPC ............................. G06N 3/049; G06N 3/065
See application file for complete search history.

(56) References Cited

U.S. PATENT DOCUMENTS

| | | |
|---|---|---|
| 7,080,054 B2 | 7/2006 | Wells et al. |
| 9,053,428 B2 | 6/2015 | Hunzinger et al. |
| 10,922,608 B2 | 2/2021 | Suda et al. |
| 11,210,577 B2 | 12/2021 | Lee |
| 2020/0202206 A1 | 6/2020 | Rummens et al. |
| 2021/0349693 A1* | 11/2021 | Ito ........................ G06N 3/065 |
| 2022/0058480 A1* | 2/2022 | Park ..................... G06N 3/049 |

FOREIGN PATENT DOCUMENTS

| | | |
|---|---|---|
| KR | 101512370 B1 | 4/2015 |
| KR | 101596656 B1 | 2/2016 |
| KR | 10-2018-0050830 A | 5/2018 |
| KR | 20190118096 A | 10/2019 |
| KR | 20200060204 A | 5/2020 |
| KR | 20200088952 A | 7/2020 |

* cited by examiner

*Primary Examiner* — Hal Schnee

(57) ABSTRACT

Disclosed is an SNN circuit including a spike generator that receives an input spike signal and converts the input spike signal into a sub-spike signal and a main spike signal, a synaptic circuit that generates an operation signal based on a weight and outputs the operation signal in response to the main spike signal, a membrane capacitor that accumulates the operation signal, and a potential correction circuit that corrects an output terminal voltage of the synaptic circuit based on a voltage of the membrane capacitor.

15 Claims, 15 Drawing Sheets

SPIKE NEURAL NETWORK CIRCUIT

CROSS-REFERENCE TO RELATED APPLICATIONS

This application claims priority under 35 U.S.C. § 119 to Korean Patent Application No. 10-2021-0074329 filed on Jun. 8, 2021, in the Korean Intellectual Property Office, the disclosures of which are incorporated by reference herein in their entireties.

BACKGROUND

Embodiments of the present disclosure described herein relate to a circuit implementing an artificial intelligence network, and more particularly, relate to a spike neural network (SNN) circuit implemented based on a semiconductor circuit.

A SNN circuit refers to one of methods of implementing an artificial intelligence network that performs a network operation on an input and then outputs an output. The SNN circuit delivers an input and a signal in a form of a pulse or spike having short duration. In more detail, the SNN circuit performs an operation in a synaptic circuit and delivers the operated result to a neuron circuit. In this case, when a voltage or charge supplied from the synaptic circuit is accumulated in a membrane capacitor of the neuron circuit and the voltage exceeds a threshold voltage, a neuron fires. However, due to the supply of electric charges by parasitic capacitance included in the synaptic circuit, an error may occur in the amount of charges accumulated in the membrane capacitor.

SUMMARY

Embodiments of the present disclosure provide an SNN circuit in which a charge operation error due to parasitic capacitance is minimized when SNN is implemented as a semiconductor circuit.

According to an embodiment, a spike neural network (SNN) circuit includes a spike generator that receives an input spike signal and converts the input spike signal into a sub-spike signal and a main spike signal, a synaptic circuit that generates an operation signal based on a weight and outputs the operation signal in response to the main spike signal, a membrane capacitor that accumulates the operation signal, and a potential correction circuit that corrects an output terminal voltage of the synaptic circuit based on a voltage of the membrane capacitor.

In an embodiment, the SNN may further include a transistor including a gate terminal that receives the main spike signal, a source terminal connected to the synaptic circuit and the potential correction circuit, and a drain terminal connected to the membrane capacitor and the potential correction circuit.

In an embodiment, in a fire section of the main spike signal, the transistor may deliver the operation signal to the membrane capacitor. When a current section is not the fire section of the main spike signal, the transistor may not deliver the operation signal to the membrane capacitor.

In an embodiment, in a fire section of the sub-spike signal, the output terminal voltage of the synaptic circuit may be controlled by the potential correction circuit to have a level the same as the voltage of the membrane capacitor.

In an embodiment, the spike generator may include a first NAND gate that outputs the sub-spike signal based on a first signal identical to the input spike signal, and a second signal obtained by inverting and delaying the first signal and a second NAND gate that outputs the main spike signal based on the first signal and a third signal obtained by inverting the second signal.

In an embodiment, the synaptic circuit may include a binary memory that stores the weight and a current-mode digital-to-analog converter (C-DAC) that generates the operation signal corresponding to the weight stored in the binary memory.

In an embodiment, the potential correction circuit may further include an oscillation prevention capacitor.

In an embodiment, the SNN may further include a neuron circuit that fires when the membrane capacitor is charged to have a voltage that is not smaller than a threshold voltage.

In an embodiment, the SNN may further include a neuron circuit that fires when the membrane capacitor is discharged to have a voltage that is not greater than a threshold voltage.

In an embodiment, the neuron circuit may output a spike signal to another SNN circuit.

According to an embodiment, an operating method of an SNN circuit includes converting an input spike signal into a sub-spike signal and a main spike signal to correct a potential, matching an output terminal voltage of a synaptic circuit based on a voltage of a membrane capacitor in a fire section of the sub-spike signal, delivering an operation signal to the membrane capacitor in a fire section of the main spike signal, and accumulating the operation signal in the membrane capacitor.

In an embodiment, the operating method of the SNN circuit may further include firing, by a neuron circuit, when the voltage of the membrane capacitor is greater than a threshold voltage.

In an embodiment, the operating method of the SNN circuit may further include firing, by a neuron circuit, when the voltage of the membrane capacitor is smaller than a threshold voltage.

In an embodiment, in the operating method of the SNN circuit, the converting of the input spike signal into the sub-spike signal and the main spike signal may include outputting the sub-spike signal by inputting a first signal, which is identical to the input spike signal, and a second signal, which is obtained by inverting and delaying the first signal, into a first NAND gate and outputting the main spike signal by inputting the first signal and a third signal, which is obtained by inverting the second signal, into a second NAND gate.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure. Specific details such as detailed components and structures are merely provided to assist the overall understanding of the embodiments of the present disclosure. Therefore, it should be apparent to those skilled in the art that various changes and modifications of the embodiments described herein may be made without departing from the scope and spirit of the present disclosure. Moreover, descriptions of well-known functions and structures are omitted for clarity and brevity. In the following drawings or in the detailed description, configurations may be connected with any other components except for components illustrated in a drawing or described in the detailed description. The terms described below are terms defined in consideration of the functions of the present disclosure and are not limited to a specific function. The definitions of the terms should be determined based on the contents throughout the specification.

Components that are described in the detailed description with reference to the terms "unit", "module", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a microelectromechanical system (MEMS), a passive element, or a combination thereof.

The present disclosure relates to a neural network circuit implemented with a semiconductor device. A neural network according to an embodiment of the present disclosure may be an artificial intelligence neural network capable of processing signals and information in a manner similar to a biological neural network. For example, a neural network circuit according to an embodiment of the present disclosure may be implemented to include configurations corresponding to axons, dendrites, membranes, and synapses, which are configurations of the biological neural network. Each of the components of the neural network according to an embodiment of the present disclosure may perform a function similar to each of components of the biological neural network.

Hereinafter, an SNN circuit that processes spikes or pulses from which signals are emitted for a short time will be representatively described. However, circuits according to an embodiment of the present disclosure are not limited thereto. For example, the circuits according to an embodiment of the present disclosure may be applied to implement other neural networks such as a perceptron-based network or a convolution-based network.

Figure 1:
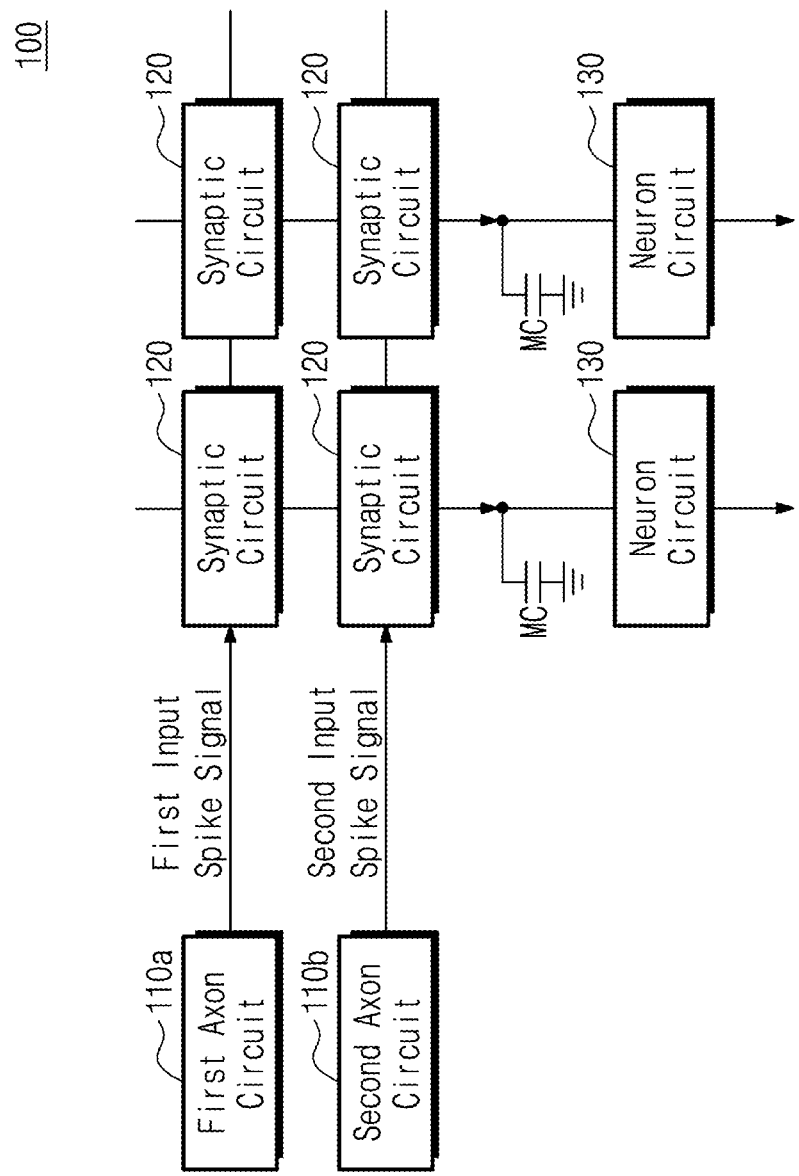
FIG. 1 is a block diagram illustrating an SNN circuit, according to an embodiment of the present disclosure.

FIG. 1 is a block diagram illustrating an SNN circuit, according to an embodiment of the present disclosure. Referring to FIG. 1, an SNN circuit 100 may include axon circuits 110a and 110b, a plurality of synaptic circuits 120, and a plurality of neuron circuits 130. For convenience of description, only two axon circuits 110a and 110b, two neuron circuits 130, and four synaptic circuits 120 are illustrated in the SNN circuit 100 of FIG. 1, but the scope of the present disclosure is not limited thereto.

The synaptic circuits 120 may receive and compute a first input spike signal and a second input spike signal from the first and second axon circuits 110a and 110b and may transmit the computed results to the corresponding neuron circuits 130. The synaptic circuits 120 may determine whether each of the axon circuits 110a and 110b are respectively connected to the corresponding neuron circuits 130, and the strength of the connection. For example, the synaptic circuits 120 may apply and compute different weights to signals (e.g., pulse signals or spike signals) received from the axon circuits 110a and 110b and then may provide the computed results to corresponding neuron circuits 130, respectively.

In an embodiment, the weight of the synaptic circuit 120 may be determined based on the relationship between the axon circuits 110a and 110b and the connected neuron circuits 130. For example, when there is no connection relationship between the axon circuits 110a and 110b and the neuron circuits 130, the weight of the corresponding synaptic circuit 120 may be set to 0.

The plurality of synaptic circuits 120 may be implemented to correspond to the axon circuits 110a and 110b and the plurality of neuron circuits 130. In an embodiment, the plurality of synaptic circuits 120 may form a two-dimensional array. However, the scope of the present disclosure is not limited thereto. For example, the scope of the present disclosure includes a case that the synaptic circuits 120 are arranged in three dimensions, unlike illustration of FIG. 1. An embodiment in which a synaptic circuit is implemented in detail will be described in more detail with reference to FIGS. 3 and 4 below.

Similarly to biological neurons, each of the neuron circuits 130 may receive a signal from the synaptic circuit 120 and may output a signal. For example, each of the neuron circuits 130 may receive an operation signal generated by the corresponding synaptic circuit 120 and may accumulate the received operation signal. Each of the neuron circuits 130 may compare a threshold voltage VTH with an accumulation value of the signal received from a synaptic circuit. When the accumulation value of the received signal is greater than the threshold voltage VTH, each of the neuron circuits 130 may fire (the generation of an output signal). A signal output from the neuron circuit 130 may be provided to another SNN circuit.

For example, when outputting the signal to the other SNN circuit, each of the neuron circuits 130 may operates as an axon circuit. That is, each of the neuron circuits 130 may receive signals from the synaptic circuits 120 and may output the signals to other synaptic circuits.

In an embodiment, the operation signal of the neuron circuit 130 may be accumulated through a capacitor. For example, the SNN circuit 100 may further include a membrane capacitor MC, which is connected in parallel with the neuron circuit 130 and which is used to accumulate the operation signal.

The membrane capacitor MC may perform a function similar to a nerve membrane of a biological neural network. For example, similarly to the nerve membrane, the membrane capacitor MC may accumulate the received operation signal. In an embodiment, when the operation signal is received, the voltage of the membrane capacitor may increase or decrease. For convenience of description, it is mainly described in the present disclosure that the voltage of the membrane capacitor MC increases depending on the accumulation of the operation signal. However, the scope of the present disclosure is not limited thereto. For example, the scope of the present disclosure includes the case that the voltage of the membrane capacitor MC is reduced depending on the accumulation of an operation signal.

When the operation signal is accumulated in the membrane capacitor MC and a voltage that is not less than the threshold voltage VTH is accumulated, the membrane capacitor MC may provide a membrane signal to the neuron circuit 120. When the neuron circuit 120 receives the membrane signal, the neuron circuit 120 may fire (the generation of an output signal).

In an embodiment, unlike network operations based on perceptrons and convolutions, the SNN 100 may not operate or deliver a digitized signal, but operate or deliver a signal in a form of a pulse or spike having short duration. In this case, the spike signal may be implemented as a voltage. In more detail, the SNN circuit may be implemented as a digital circuit that classifies a voltage in the case where a spike signal is entered, as HIGH and classifies a voltage in the case where a spike signal is not entered, as LOW.

Figure 2A:
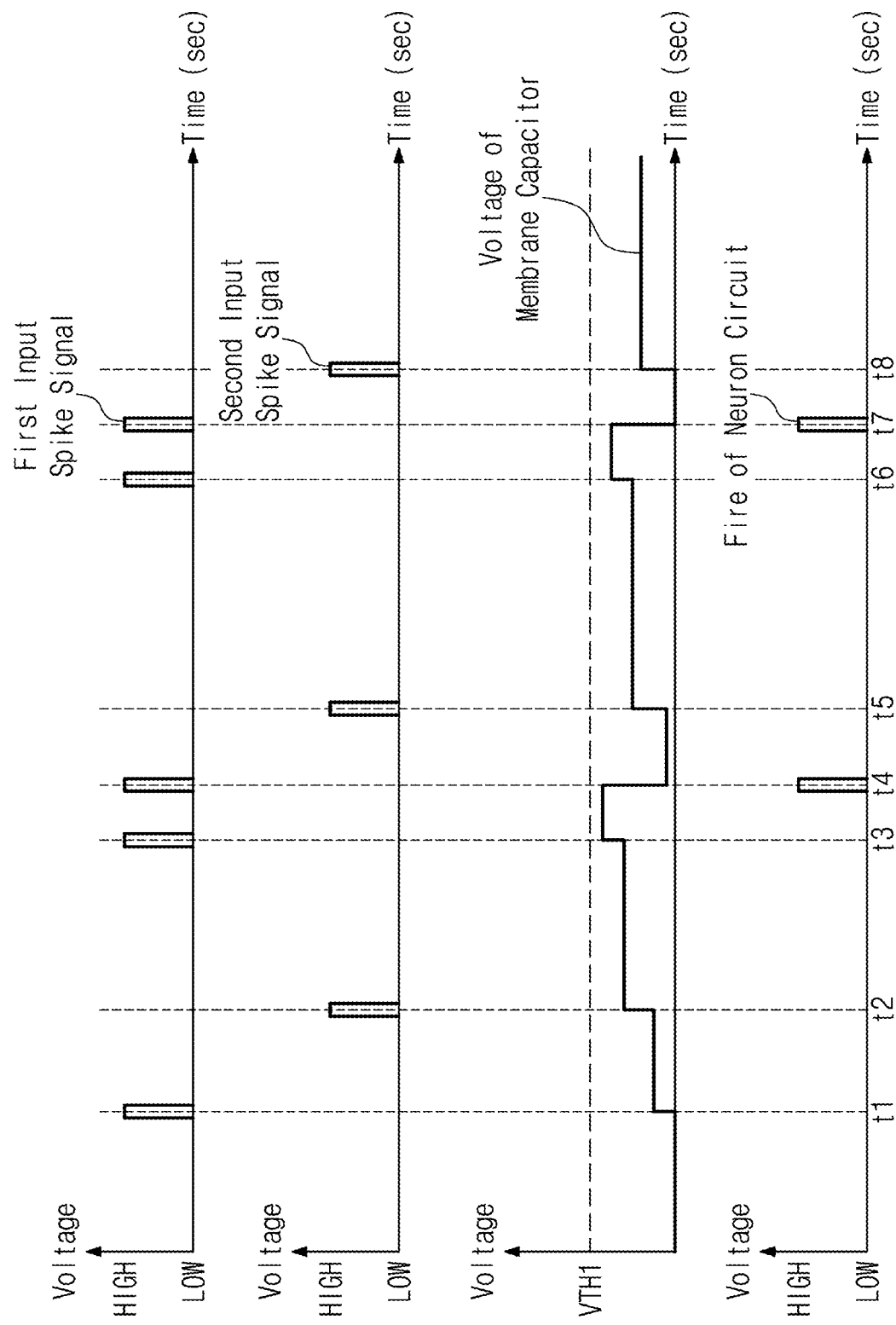
FIGS. 2A and 2B are timing diagrams for describing operations of a synaptic circuit and a neuron circuit with respect to an input spike signal in the SNN circuit of FIG. 1.
Figure 2B:
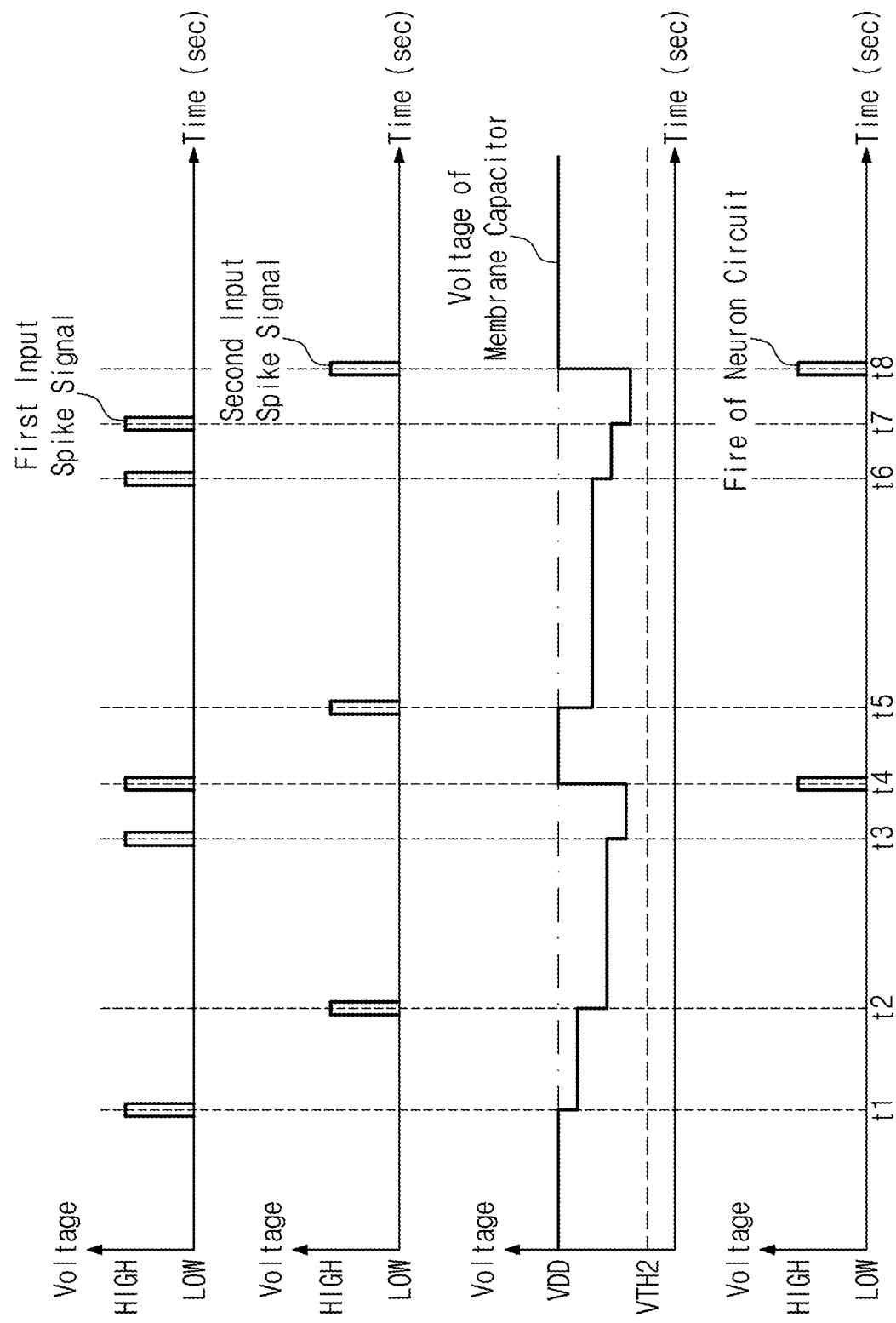

FIGS. 2A and 2B are timing diagrams for describing operations of a synaptic circuit and a neuron circuit with respect to an input spike signal in the SNN circuit of FIG. 1. In FIGS. 2A and 2B, a horizontal axis represents a time, and a vertical axis represents a voltage. Components having the same reference numerals as components of FIG. 1, which are described with reference to the drawings below, may mean the same as or similar to components as components of FIG. 1.

Referring to FIGS. 1, 2A, and 2B, the first axon circuit 110a and the second axon circuit 110b provide input spike signals having different periods from each other. However, the scope of the present disclosure is not limited to an SNN circuit that processes an input spike signal having a period. For example, the scope of the present disclosure includes an SNN circuit that processes an input spike signal randomly or intermittently. Furthermore, for convenience of description, the horizontal axis (or time axis) of FIGS. 2A and 2B may be represented to be exaggerated, but the scope of the present disclosure is not limited thereto.

Referring to FIGS. 1 and 2A, when a first input spike signal is received from the first axon circuit 110a and a second input spike signal is received from the second axon circuit 110b, an operation signal may be accumulated in the membrane capacitor MC depending on a weight set for the synaptic circuit 120. In this case, the level of the voltage of the membrane capacitor MC may increase.

In an embodiment, weights corresponding to the first axon circuit 110a and the second axon circuit 110b may be the same as or different from each other. For concise and detailed descriptions, it is assumed that a weight corresponding to the second axon circuit 110b is greater than a weight corresponding to the first axon circuit 110a, but the scope of the present disclosure is not limited thereto.

Continuing to refer to FIGS. 1 and 2A, when an input spike signal is entered at first to fourth time points t1 to t4 and at fifth to eighth time points t5 to t8, the voltage of the membrane capacitor increases (or the membrane capacitor is charged). Among the first to eighth time points t1 to t8, at the second time point t2, the fifth time point t5, and the eighth time point t8, the weight corresponding to the second axon circuit 110b is calculated, and thus a voltage increment (e.g., a voltage increment of the membrane capacitor MC at time points t2, t5, and t8) of the membrane capacitor MC by the second input spike signal may be greater than a voltage increment (e.g., a voltage increment of the membrane capacitor MC at time points t1, t3, t4, t6, and t7) of the membrane capacitor MC by the first input spike signal.

At the fourth time point t4 and the eighth time point t8, the voltage of the membrane capacitor MC exceeds the threshold voltage VTH1 due to the accumulation of operation signals obtained by computing input spike signals, the membrane capacitor MC may transmit a membrane signal to the neuron circuit 130. In this case, the voltage of the membrane capacitor MC may be reduced to zero, and the neuron circuit 130 may fire and output a spike signal based on the received voltage. That is, the frequency and/or time point of a spike signal output through the fire of the neuron circuit 130 may vary depending on the fire section of the input spike signal and the weight stored in the synaptic circuit 120.

FIG. 2B illustrates an operation of an SNN circuit implemented to reduce the voltage of the membrane capacitor depending on the accumulation of the operation signal unlike the timing diagram of FIG. 2A. Referring to FIGS. 1 and 2B, when input spike signals are entered from the first axon circuit 110a and the second axon circuit 110b, the voltage of the membrane capacitor MC may be reduced.

Continuing to refer to FIGS. 1 and 2B, when the potential of the membrane capacitor MC is reduced such that the potential of the membrane capacitor MC is lower than a threshold voltage VTH2, due to the accumulation of operation signals obtained by computing input spike signals, the potential of the membrane capacitor MC may increase to a reset potential VDD. In this case, the membrane capacitor MC may transmit a membrane signal to the neuron circuit 130. When the neuron circuit 130 receives the membrane signal, the neuron circuit 130 may fire and output a spike signal. In addition to the above-mentioned descriptions, the operation of the SNN circuit 100 in FIG. 2B is similar to that described in FIG. 2A, and thus a detailed description thereof will be omitted to avoid redundancy.

Figure 3:
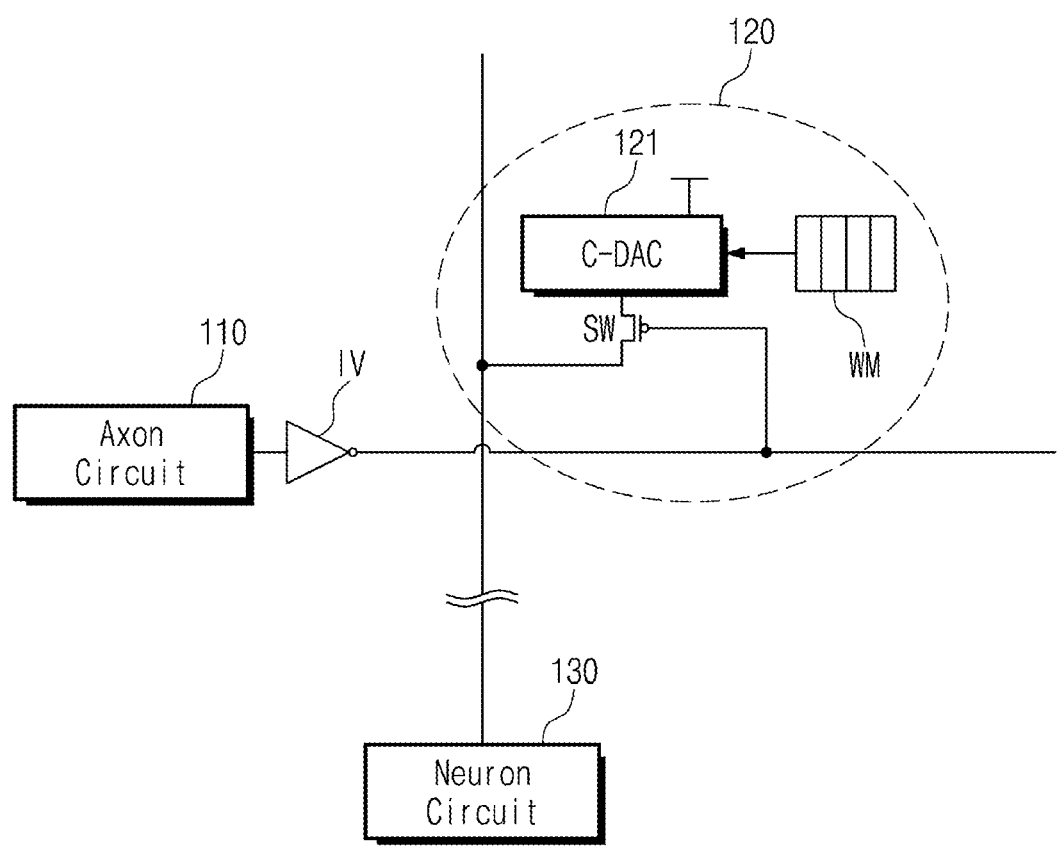
FIG. 3 is a diagram illustrating the synaptic circuit of FIG. 1 in detail.

FIG. 3 is a diagram illustrating the synaptic circuit of FIG. 1 in detail. Referring to FIGS. 1 and 3, the synaptic circuit 120 may be implemented to correspond to an axon circuit 110 and the neuron circuit 130. The synaptic circuit 120 may include a current-mode digital-to-analog converter (C-DAC) 121, a weight memory WM, and a switch SW. For a concise description, only the one axon circuit 110, the one neuron circuit 130, and the one synaptic circuit 120 are illustrated in FIG. 3, but the scope of the present disclosure is not limited thereto. Also, for concise description, the switch SW is shown to be included in the synaptic circuit 120, but the scope of the present disclosure is not limited thereto. For example, the switch SW may be positioned outside the synaptic circuit 120.

The weight memory WM may store predefined weights and may provide the stored weights to the C-DAC 121. The weight memory WM may be implemented as a binary memory. For example, the weight memory may be implemented as a memory capable of storing 4 bits. However, the scope of the present disclosure is not limited thereto. For example, the size of the binary memory may be variously implemented depending on the purpose of the SNN circuit 100.

In an embodiment, the weight memory may be implemented with, for example, volatile memories such as a static random access memory (SRAM), a dynamic RAM (DRAM), and a synchronous DRAM (SDRAM) or nonvolatile memories such as a phase-change RAM (PRAM), a magnetic RAM (MRAM), a resistive RAM (RRAM), and a ferroelectric RAM (FRAM) or may be implemented with a combination thereof.

The C-DAC 121 may supply a current or electric charge to the neuron circuit 130 based on the weight provided from the weight memory WM. For example, the C-DAC 121 may include current sources, which match binary weights and which have the current amounts classified by using the power of 2. Hereinafter, the implementation of the C-DAC 121 is described in more detail with reference to FIG. 4.

In an embodiment, an inverter IV for inverting an input spike signal may be further included between the axon circuit 110 and the synaptic circuit 120. Depending on the type of transistor (e.g., the switch SW) included in the SNN circuit according to an embodiment of the present disclosure, the inverter IV may or may not be included.

The switch SW may determine whether the C-DAC 121 provides the electric charge or current to the neuron circuit 130. For example, when the input spike signal received from the axon circuit 110 is not within a fire section, the switch SW may block the electric charge or current provided by the C-DAC 121 to the neuron circuit 130. In the fire section of the input spike signal received from the axon circuit 110, the switch SW may allow the C-DAC 121 to provide the electric charge or current to the neuron circuit 130.

In an embodiment, the switch SW may be implemented as a transistor. For example, the switch may be implemented as a transistor such as a bipolar junction transistor (BJT) or a field effect transistor (FET). In the present disclosure, for concise description, it is mainly described that the switch SW is implemented by using a p-channel metal-oxide-semiconductor field-effect transistor (PMOS transistor). In this case, in the fire section of the input spike signal, which is inverted by the inverter IV and which is received from the axon circuit 110, the switch SW may be turned on, and then the switch SW may deliver the electric charge or current from the C-DAC 121 to the membrane capacitor MC.

Figure 4:
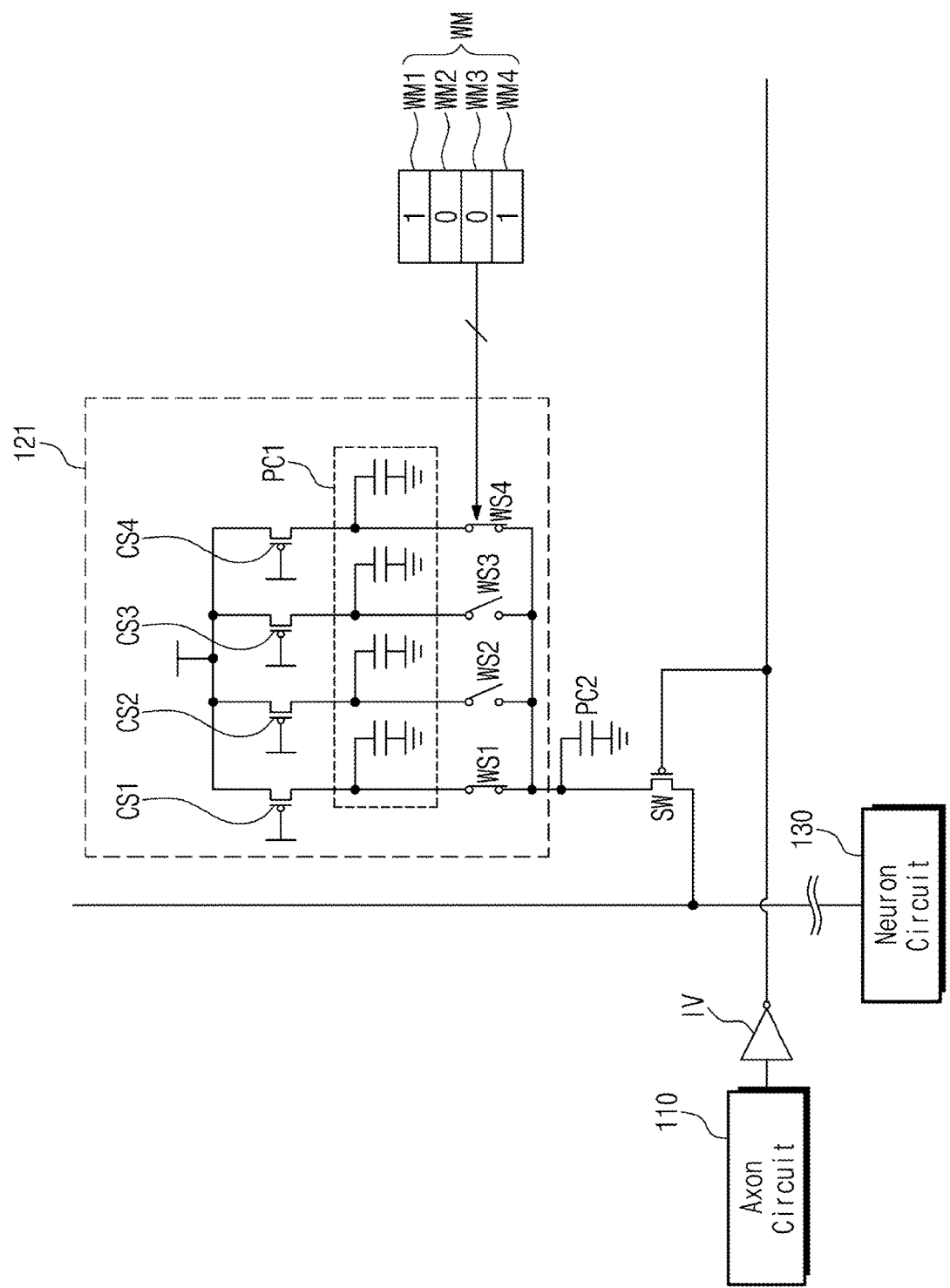
FIG. 4 illustrates an embodiment in which a synaptic circuit of FIG. 3 is implemented, in detail.

FIG. 4 shows an embodiment in which the synaptic circuit of FIG. 3 is implemented, in detail. Referring to FIGS. 3 and 4, the synaptic circuit 120 may include the C-DAC 121, the weight memory WM, and the switch SW. The weight memory WM and the switch SW are described with reference to FIG. 3, and a description thereof is thus omitted to avoid redundancy.

The C-DAC 121 may include a plurality of current sources CS1 to CS4 for supplying current, and weight switches WS1 to WS4.

In an embodiment, each of the plurality of current sources CS1 to CS4 may be implemented with a transistor. A gate terminal and a source terminal of each of the plurality of current sources CS1 to CS4 may be connected to a bias power supply. In this case, each of the plurality of current sources CS1 to CS4 may perform an independent current source function and may supply current to the C-DAC 121. For convenience of description, each of the plurality of current sources CS1 to CS4 is described as being implemented with a PMOS transistor. However, the scope of the present disclosure is not limited thereto. For example, the scope of the present disclosure includes various embodiments of current sources that those skilled in the art are capable of implementing.

Each of the weight switches WS1 to WS4 may be controlled through the weight memory WM. That is, each of the weight switches WS1 to WS4 may be turned on or turned off depending on a value stored in a memory cell of the corresponding weight memory WM. For example, the first memory cell WM1 of the weight memory WM may correspond to the first weight switch WS1; the second memory cell WM2 of the weight memory WM may correspond to the second weight switch WS2; the third memory cell WM3 of the weight memory WM may correspond to the third weight switch WS3; and, the fourth memory cell WM4 of the weight memory WM may correspond to the fourth weight switch WS4.

In an embodiment, when a binary weight data value stored in the weight memory WM is [1001], the first weight switch WS1 corresponding to the first current source CS1 and the fourth weight switch WS4 corresponding to the fourth current source CS4 may be turned on, and the second weight switch WS2 corresponding to the second current source CS2 and the third weight switch WS3 corresponding to the third current source CS3 may be turned off.

In an embodiment, current amounts may be classified by using a power of 2 such that each of the first to fourth current sources CS1 to CS4 matches binary weight data stored in the weight memory WM. For example, the amount of current provided by the first current source CS1 may be eight times the amount of current provided by the fourth current source CS4; the amount of current provided by the second current source CS2 may be four times the amount of current provided by the fourth current source CS4; and, the amount of current provided by the third current source CS3 may be twice the amount of current provided by the fourth current source CS4.

In the meantime, the synaptic circuit 120 may include a plurality of parasitic capacitances. For example, a plurality of parasitic capacitances may be generated by a weight memory switch WS or the switch SW inside the C-DAC 121. Referring to FIG. 4, for convenience of description, the parasitic capacitances in the C-DAC 121 may be expressed as an equivalent circuit corresponding to first parasitic capacitors PC1. The parasitic capacitance of the switch SW may be expressed as an equivalent circuit corresponding to a second parasitic capacitor PC2. Hereinafter, the first parasitic capacitors PC1 and the second parasitic capacitor PC2 may be collectively referred to as an equivalent parasitic capacitor PC.

The parasitic capacitor PC may cause an error in the amount of electric charges supplied to the membrane capacitor MC or the magnitude of the operation signal accumulated in the membrane capacitor MC. The effect of the parasitic capacitor PC on the membrane capacitor MC will be described in detail with reference to FIG. 5 below.

Figure 5:
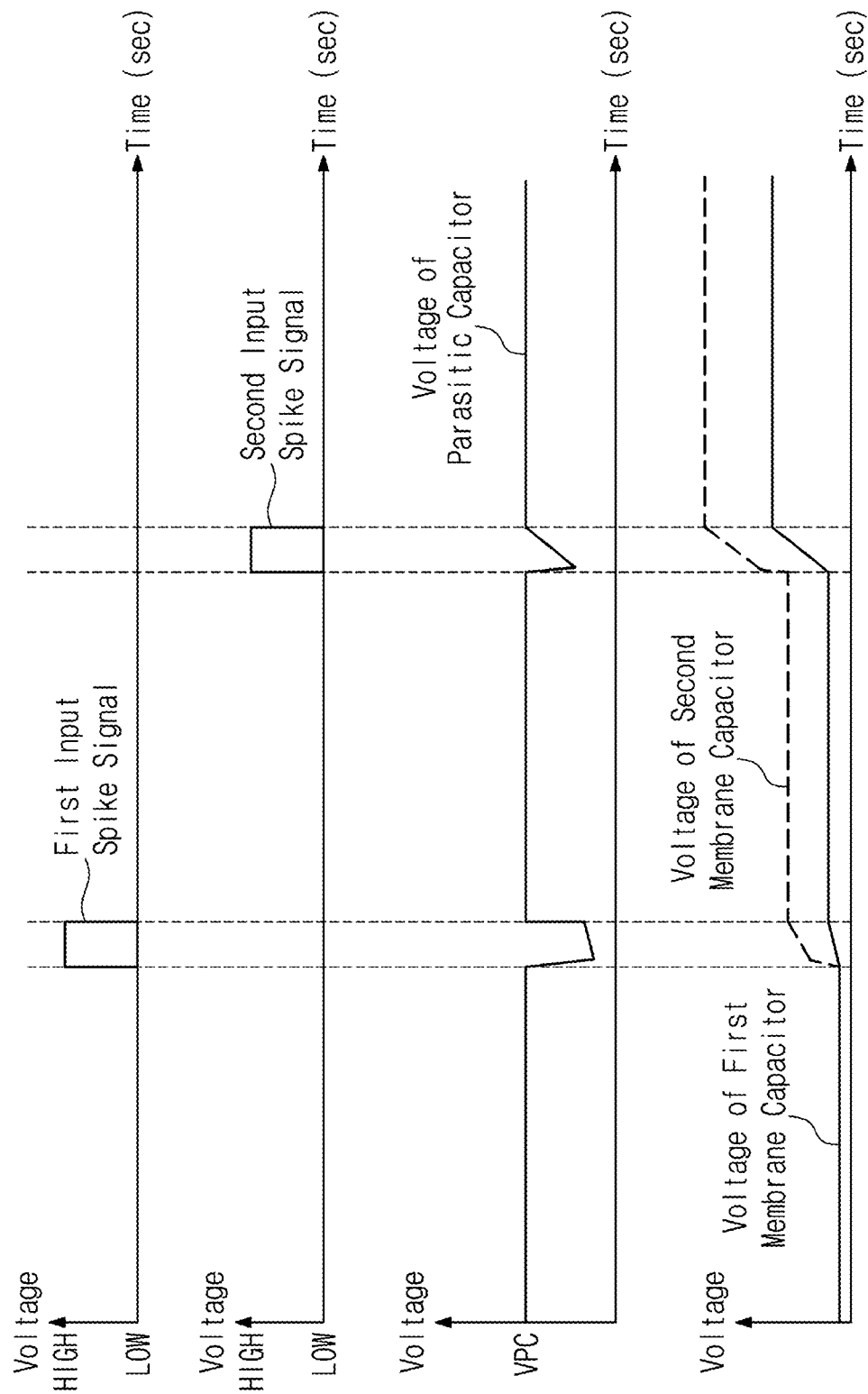
FIG. 5 is a diagram illustrating an effect of a parasitic capacitor on a membrane capacitor.

FIG. 5 is a diagram illustrating an effect of a parasitic capacitor on a membrane capacitor. In each graph of FIG. 5, a horizontal axis represents a time, and a vertical axis represents a voltage.

Referring to FIGS. 1, 4, and 5, in fire sections of the first and second input spike signals respectively received from the first and second axon circuits 110*a* and 110*b*, the voltage of the membrane capacitor MC increases depending on the weight set for the synaptic circuit 120. In this case, weights determined to respectively correspond to the first and second axon circuits 110*a* and 110*b* may be the same as or different from each other. A process of accumulating charges of membrane capacitor MC is similar to that described in FIG. 2A, and thus a detailed description will be omitted to avoid redundancy.

In the fire sections of the first and second input spike signals, the voltage (or charge) of the parasitic capacitor PC of the synaptic circuit 120 may be delivered to the membrane capacitor MC. In this case, the voltage of the parasitic capacitor PC of the synaptic circuit may be reduced, and the voltage of the membrane capacitor MC may be more accumulated.

Continuing to refer to FIG. 5, a change in voltage (a first membrane capacitor voltage) of the membrane capacitor MC in the case where the parasitic capacitor PC is not present is shown by a solid line, and a change in voltage (a second membrane capacitor voltage) of the membrane capacitor MC in the case where the parasitic capacitor PC is present is shown by a dotted line. In the fire sections of the input spike signals received from the axon circuits 110a and 110b, the voltage level of the parasitic capacitor PC may be reduced from a start voltage VPC. In this case, voltages of the first and second membrane capacitors indicated by dotted and solid lines may be different from each other. For example, when the parasitic capacitor PC is present, charges by the parasitic capacitor PC flows into the membrane capacitor MC, and thus a voltage (shown by the dotted line) of the second membrane capacitor may become greater than a voltage (shown by the solid line) of the first membrane capacitor. That is, electric charges flowing from the parasitic capacitor PC may be unintentionally over-accumulated in the membrane capacitor MC.

In an embodiment, the fire time point of the neuron circuit 130 corresponding to the membrane capacitor MC may vary due to the above-mentioned effect of the parasitic capacitor PC on the membrane capacitor MC. In this case, the operation error or performance degradation may occur in the SNN circuit 100. The present disclosure may provide a method for solving the above-described technical issues.

Figure 6:
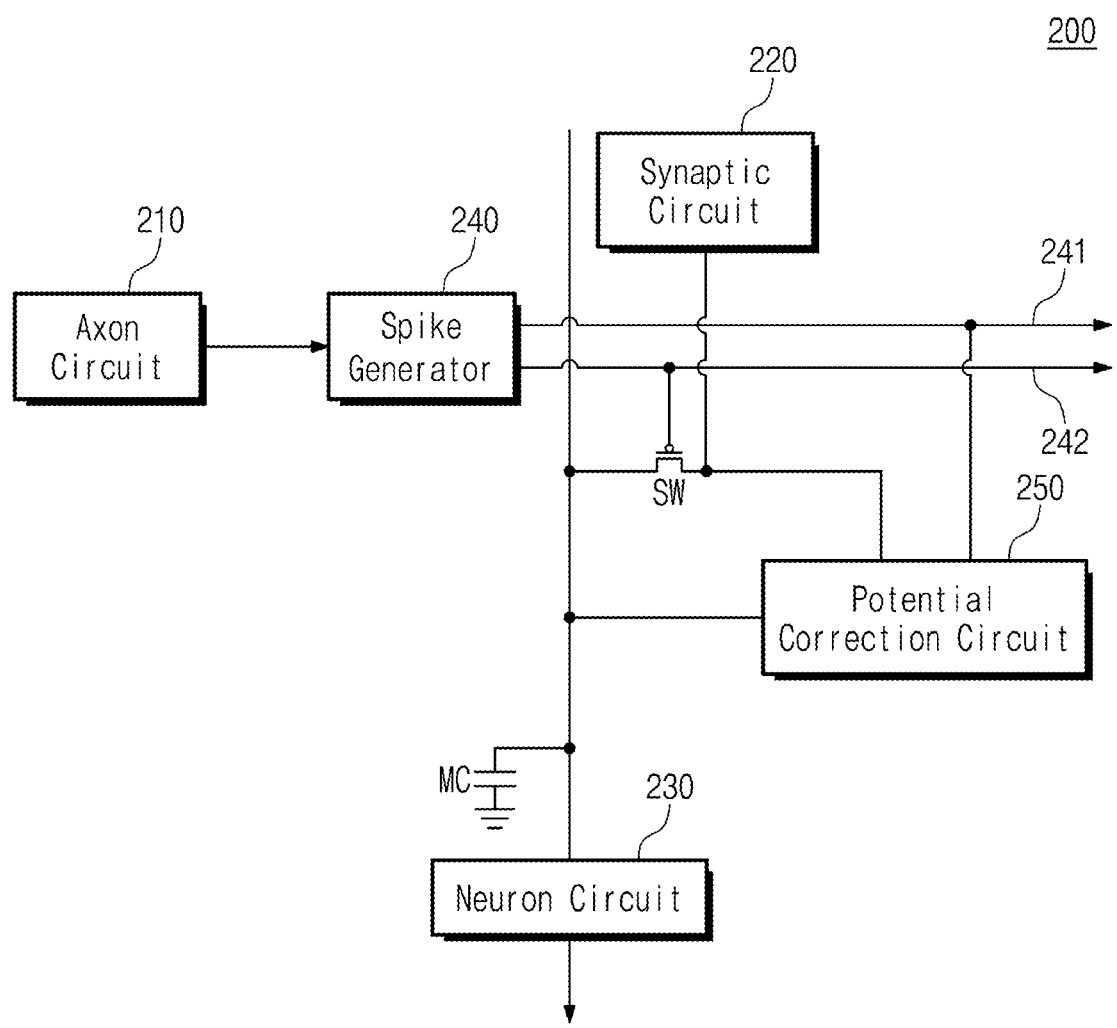
FIG. 6 shows an SNN circuit, according to an embodiment of the present disclosure.

FIG. 6 shows an SNN circuit, according to an embodiment of the present disclosure. Referring to FIG. 6, an SNN circuit may include an axon circuit 210, a synaptic circuit 220, a neuron circuit 230, and the membrane capacitor MC and may further include a spike generator 240 and a potential correction circuit 250. The axon circuit 210, the synaptic circuit 220, the neuron circuit 230, and the membrane capacitor MC may perform functions the same as or similar to those of the axon circuits 130a and 130b, the synaptic circuit 120, the neuron circuit 130, and the membrane capacitor MC of FIG. 1, and thus a detailed description thereof will be omitted to avoid redundancy. The switch SW of an SNN circuit 200 may perform the same operation and function as the switch SW described with reference to FIG. 3, and thus a detailed description is omitted to avoid redundancy. For descriptive convenience, the switch SW of an SNN circuit 200 is described as a component that is present outside the synaptic circuit 220.

The spike generator 240 may generate a signal for controlling the voltage of the parasitic capacitor PC or the membrane capacitor MC. For example, the spike generator 240 may convert an input spike signal into a sub-spike signal and a main spike signal. Referring to FIG. 6, the sub-spike signal output from the spike generator 240 may be directly or indirectly delivered to the synaptic circuit 220, the potential correction circuit 250, and the neuron circuit 230 through a sub-spike signal line 241. The main spike signal output from the spike generator 240 may be directly or indirectly delivered to the synaptic circuit 220, the potential correction circuit 250, and the neuron circuit 230 through a main spike signal line 242. Hereinafter, a detailed implementation of the spike generator 240, a sub-spike signal and a main spike signal will be described in more detail with reference to FIGS. 8 and 9.

The potential correction circuit 250 may be connected to the sub-spike signal line 241, may have a common node in contact with the neuron circuit 230, the membrane capacitor MC, and a drain terminal of the switch SW, and may have a common node in contact with the synaptic circuit 220 and the source terminal of the switch SW. For example, the connection between the potential correction circuit 250 and the synaptic circuit 220 may be used to measure or control a voltage of the parasitic capacitor PC or an output terminal voltage of the synaptic circuit 220. The connection between the potential correction circuit 250 and the membrane capacitor MC may be used to measure the voltage of the membrane capacitor MC.

The potential correction circuit 250 may operate only in the fire section of the sub-spike signal. For example, the sub-spike signal may be input to the potential correction circuit 250 through the sub-spike signal line 241. In the fire section of the sub-spike signal, the potential correction circuit 250 may operate to reduce a voltage difference between the membrane capacitor MC and the parasitic capacitor PC.

The potential correction circuit 250 may measure or control the voltage difference between the parasitic capacitor PC and the membrane capacitor MC, through a connection with the synaptic circuit 220, and through a connection with the neuron circuit 230 or the membrane capacitor MC. For example, the potential correction circuit 250 may receive the voltage of the parasitic capacitor PC and the membrane capacitor MC. the potential correction circuit 250 may perform at least one of an operation of decreasing the voltage of the parasitic capacitor PC when the voltage of the parasitic capacitor PC is higher than the voltage of the membrane capacitor MC or an operation of increasing the voltage of the parasitic capacitor PC when the voltage of the parasitic capacitor PC is lower than the voltage of the membrane capacitor MC. In this case, the voltage of the parasitic capacitor PC or the output terminal voltage of the synaptic circuit 220 may be controlled to be the same as the voltage of the membrane capacitor MC.

In an embodiment, after the voltage of the parasitic capacitor PC or the output terminal voltage of the synaptic circuit 220 is controlled to be the same as the voltage of the membrane capacitor MC, an operation signal may be provided from the synaptic circuit 220 to the membrane capacitor MC. For example, in the fire section of the main spike signal after the fire section of the sub-spike signal, the switch SW may control a current or electric charge such that the current or electric charge flows from the synaptic circuit 220 to the neuron circuit 230 or the membrane capacitor MC.

According to an embodiment of the present disclosure, the electric charge or voltage leaking from the parasitic capacitor PC to the membrane capacitor MC may be minimized. For example, similarly to the graph of the first membrane capacitor voltage shown by the solid line in FIG. 5, the SNN circuit 200 including the spike generator 240 and the potential correction circuit 250 according to an embodiment of the present disclosure may minimize the voltage over-accumulation of the membrane capacitor MC by the parasitic capacitor PC. Accordingly, according to an embodiment of the present disclosure, an SNN circuit having minimized errors and improved performance may be provided.

Hereinafter, detailed embodiments in which a potential correction circuit is implemented will be described with reference to FIGS. 11 to 14. In the drawings below, it is described that the potential correction circuit is implemented to include an operational amplifier (op-amp) and/or transistors, but the scope of the present disclosure is not limited thereto. For example, the scope of the present disclosure may include an SNN circuit implemented with various components for controlling the potential difference between the membrane capacitor and the parasitic capacitor.

Figure 7:
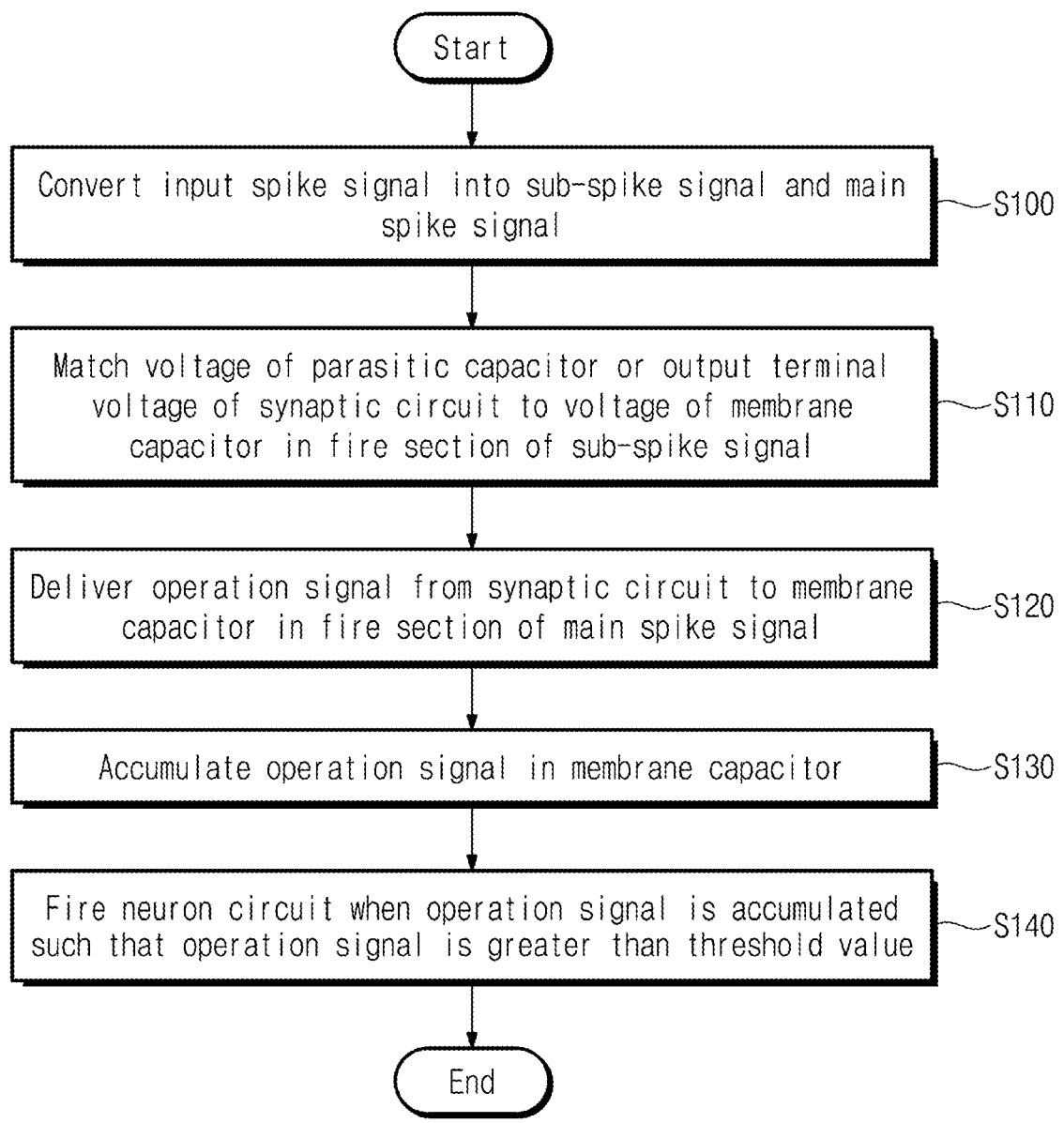
FIG. 7 is a flowchart illustrating an operating method of an SNN circuit, according to an embodiment of the present disclosure.

FIG. 7 is a flowchart illustrating an operating method of an SNN circuit including a potential correction circuit. Referring to FIGS. 6 and 7, in operation S100, the SNN circuit 200 may convert an input spike signal into a sub-spike signal and a main spike signal through the spike generator 240. In this case, the sub-spike signal may be delivered through the sub-spike signal line 241, and the main spike signal may be delivered through the main spike signal line 242.

In operation S110, in a fire section of the sub-spike signal, the SNN circuit 200 may control the voltage of the parasitic capacitor PC or the output terminal voltage of the synaptic circuit 220 based on the voltage of the membrane capacitor MC. For example, through the potential correction circuit 250, the SNN circuit 200 may increase the voltage of the parasitic capacitor PC when the voltage of the membrane capacitor MC is higher than the voltage of the parasitic capacitor PC, and may decrease the voltage of the parasitic capacitor PC when the voltage of the membrane capacitor MC is lower than the voltage of the parasitic capacitor PC. In this case, the voltage of the membrane the parasitic capacitor PC or the output terminal voltage of the synaptic circuit 220 may match the voltage of the membrane capacitor MC.

In operation S120, the SNN circuit 200 may deliver an operation signal from the synaptic circuit 220 to the membrane capacitor MC in the fire section of the main spike signal. In an embodiment, the operation signal may be delivered depending on the input of the main spike signal via the switch SW thus turned on or off.

In operation S130, the SNN circuit 200 may accumulate the operation signal received from the synaptic circuit 220 in the membrane capacitor MC.

In operation S140, when a voltage, which is greater than a threshold voltage, is accumulated in the membrane capacitor MC, the SNN circuit 200 may fire the neuron circuit 230. For descriptive convenience, it is described that the voltage of the membrane capacitor MC increases when an operation signal is input to the membrane capacitor MC, but the scope of the present disclosure is not limited thereto. For example, the scope of the present disclosure may include an embodiment in which the voltage of the membrane capacitor MC decreases when an operation signal is input to the membrane capacitor MC. For example, when the operation signal is accumulated and then the voltage of the membrane capacitor MC is lower than the threshold voltage, the neuron circuit 230 may fire.

Figure 8:
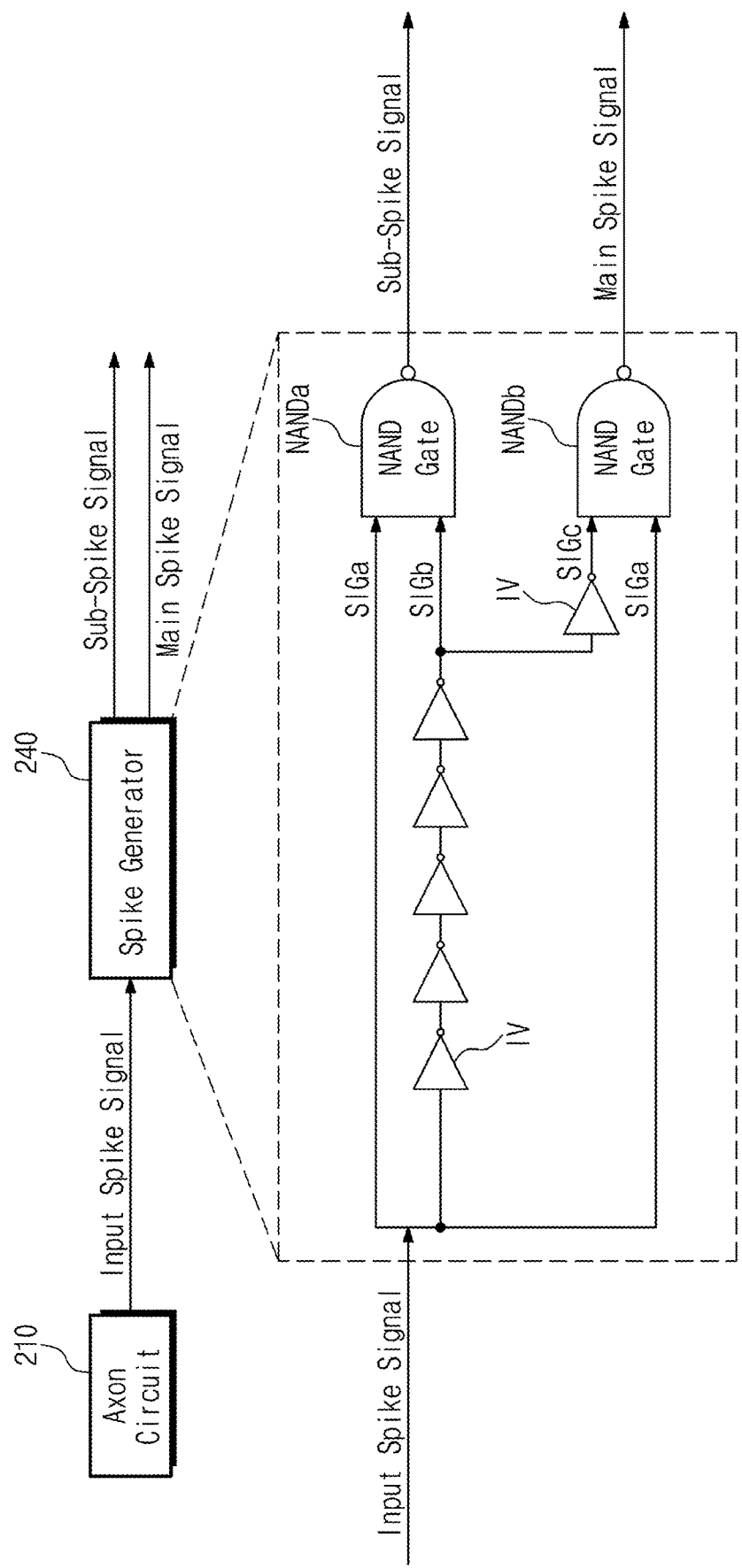
FIG. 8 is a diagram illustrating an embodiment of the spike generator of FIG. 6.

FIG. 8 is a diagram illustrating an embodiment of the spike generator of FIG. 6. Referring to FIGS. 6 and 8, the spike generator 240 may generate a sub-spike signal and a main spike signal based on an input signal (e.g., an input spike signal) received from the axon circuit 210.

In an embodiment, the spike generator 240 may convert the input spike signal received from the axon circuit 110 into first to third signals SIGa to SIGc. For example, the spike generator 240 may use the input spike signal received from the axon circuit 110 as the first signal SIGa, may convert a signal, which is obtained by delaying and inverting the phase of the input spike signal, into the second signal SIGb, and may convert a signal obtained by inverting the phase of the second signal SIGb into the third signal SIGc.

In an embodiment, a process of generating the second signal SIGb by delaying and inverting the phase of the input spike signal may be implemented through a plurality of inverter strings. However, the scope of the present disclosure is not limited thereto. For example, a process of generating the second signal SIGb from the first signal SIGa may be implemented in a manner of delaying a signal through a buffer circuit including an op-amp or semiconductor devices. That is, the technical scope of the spike generator 240 according to an embodiment of the present disclosure may include various embodiments in which a person skilled in the art may implement phase delay and inversion.

The first to third signals SIGa to SIGc thus classified may be converted into a sub-spike signal and a main spike signal through NAND gates. For example, the first signal SIGa and the second signal SIGb may be input to a first NAND gate NANDa and then may be converted into the sub-spike signal. The first signal SIGa and the third signal SIGc may be input to a second NAND gate NANDb and then may be converted into the main spike signal. The relationship between the first to third signals SIGa to SIGc, the sub-spike signal, and the main spike signal will be described in more detail with reference to FIG. 9.

Figure 9:
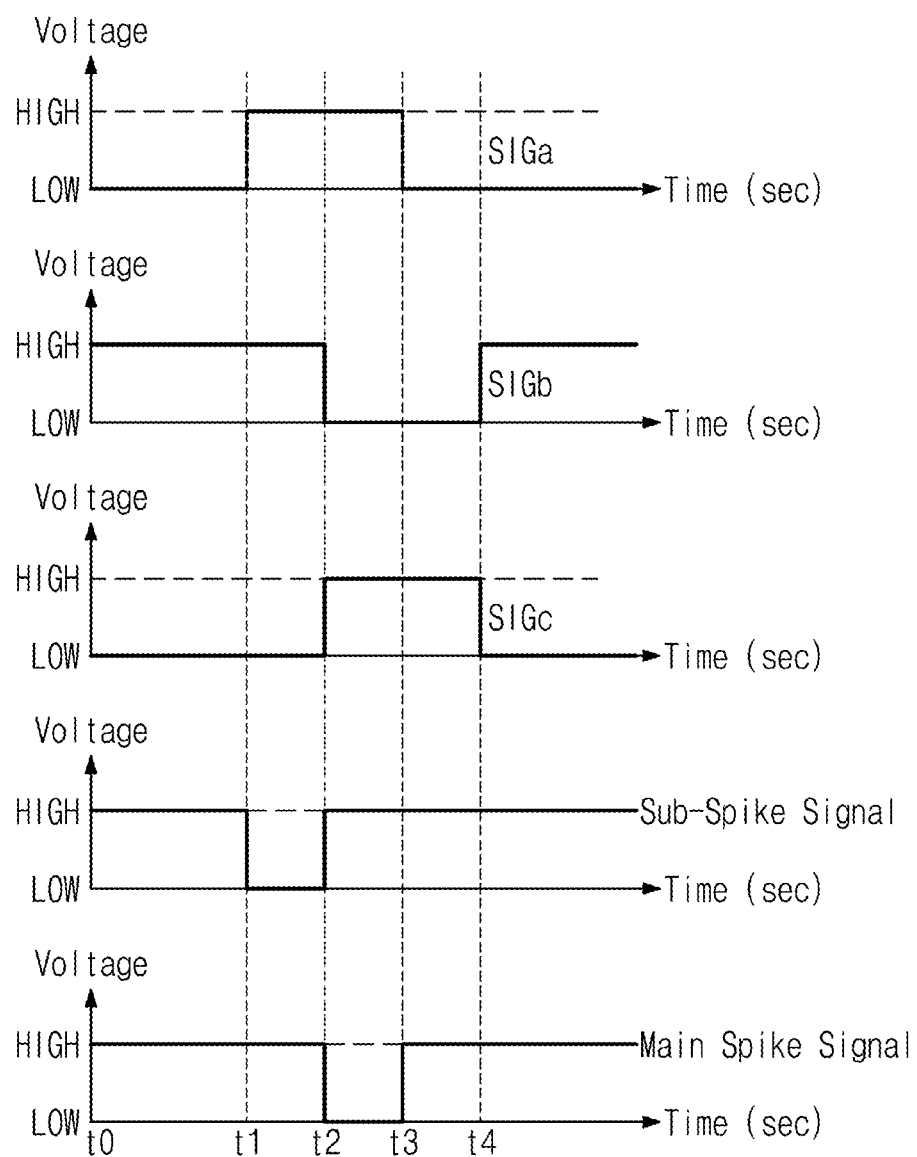
FIG. 9 illustrates the signals of FIG. 8 in more detail.

FIG. 9 illustrates the signals of FIG. 8 in more detail. In FIG. 9, a horizontal axis represents a time, and a vertical axis represents a voltage. Referring to FIG. 9, in a time section between a first time point t1 and a third time point t3, an input spike signal or the first signal SIGa input from the axon circuit 110 has HIGH voltage. The second signal SIGb obtained by delaying the first signal SIGa by an interval of (t2-t1) and then inverting the phase of the delayed signal has LOW voltage in a time section between a second time point t2 and a fourth time point t4 and has HIGH voltage in a time section between a 0-th time point t0 and a second time point t2. The third signal SIGc obtained by inverting the phase of the second signal SIGb has HIGH voltage in the time section between the second time point t2 and the fourth time point t4 and has LOW voltage in the time section between the 0-th time point t0 and the second time point t2.

Each of the first NAND gate NANDa and the second NAND gate NANDb may be implemented as a logical operator circuit that inverts a result of AND gate. For example, the NAND gate may be implemented with an op-amp or semiconductor devices. Each NAND gate outputs LOW voltage only when each of two input signals has HIGH voltage. Otherwise, each NAND gate outputs HIGH voltage. That is, the sub-spike signal output by inputting the first signal SIGa and the second signal SIGb to the first NAND gate NANDa has LOW voltage in only the time section between the first time point t1 and the second time point t2 in which the first signal SIGa and the second signal SIGb simultaneously have HIGH voltage, and has HIGH voltage in the time section between the 0-th time point t0 and the first time point t1 and the time section between the second time point t2 and the fourth time point t4. That is, the main spike signal output by inputting the first signal SIGa and the third signal SIGc to the second NAND gate NANDb has LOW voltage in only the time section between the second time point t2 and the third time point t3 in which the first signal SIGa and the third signal SIGc simultaneously have HIGH voltage, and has HIGH voltage in the time section between the 0-th time point t0 and the second time point t2 and the time section between the third time point t3 and the fourth time point t4.

However, the configuration described with reference to FIG. 9 is provided to help the understanding of the embodiment according to the present disclosure. Unlike the above description, the technical scope of the present disclosure may include various embodiments for converting an input signal into a sub-spike signal and a main spike signal.

When an input spike signal is converted into a sub-spike signal and a main spike signal, an SNN circuit having minimal influence of the parasitic capacitor PC may be implemented. Hereinafter, the detailed embodiment of the SNN circuit including the spike generator 240 will be described with reference to FIGS. 11 to 14.

Figure 10:
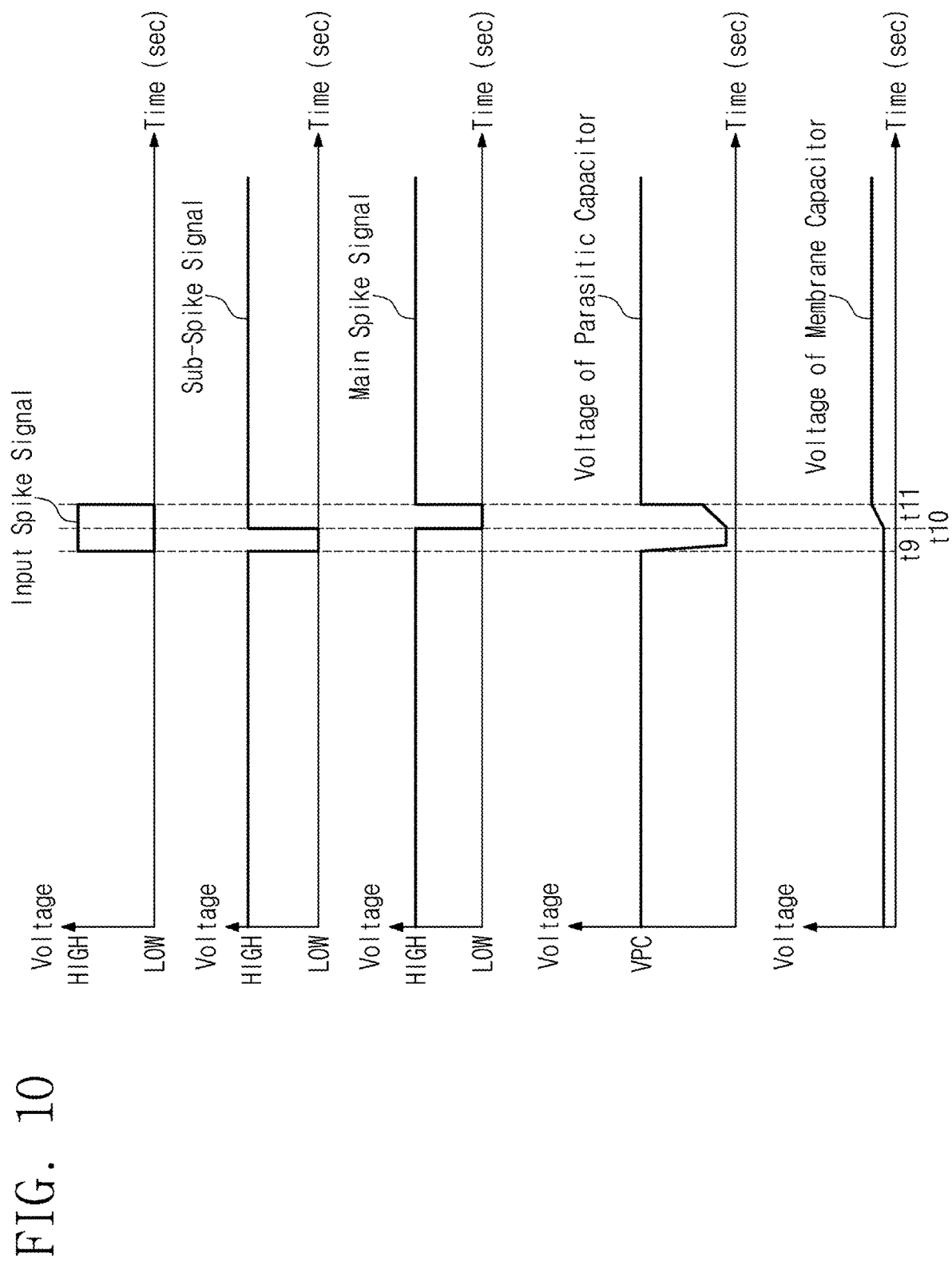
FIG. 10 illustrates an effect of the sub-spike signal and the main spike signal of FIG. 9 on a voltage of a membrane capacitor.

FIG. 10 illustrates an effect of the sub-spike signal and the main spike signal of FIG. 9 on a voltage of a membrane capacitor. In each graph of FIG. 5, a horizontal axis represents a time, and a vertical axis represents a voltage. For descriptive convenience, an effect of a sub-spike signal and a main spike signal, which are output in response to an input spike signal input from an axon circuit, on the membrane capacitor will be described with reference to FIG. 5. However, the scope of the present disclosure is not limited thereto. For example, the scope of the present disclosure may include a case that a plurality of input spike signals are respectively received from a plurality of axon circuits, and a sub-spike signal and a main spike signal are output.

Referring to FIGS. 6 and 8 to 10, the input spike signal received from the axon circuit 210 may be converted into a sub-spike signal and a main spike signal through the spike generator 240. The input spike signal may fire in a time section between the ninth time point t9 and the eleventh time point t11. In this case, the input spike signal may have HIGH voltage in the time section between the ninth time point t9 and the eleventh time point t11.

The sub-spike signal may fire in a time section between the ninth time point t9 and the tenth time point t10. In this case, the sub-spike signal may have LOW voltage in the time section between the ninth time point t9 and the tenth time point t10. In the fire section (t9 to t10) of the sub-spike signal, a voltage of the parasitic capacitor PC may decrease during a short time interval through the feedback of the potential correction circuit 250 such that a voltage of the parasitic capacitor PC matches a voltage of the membrane capacitor MC. After the voltage of the parasitic capacitor PC matches the voltage of the membrane capacitor MC, the voltage of the parasitic capacitor PC may be maintained before the fire section of the main spike signal.

The main spike signal may fire in the time section between the tenth time point t10 and the eleventh time point t11. In this case, the main spike signal may have LOW voltage in the time section of the tenth time point t10 and the eleventh time point t11. In the fire section (t10 to t11) of the main spike signal, an electric charge or current may be delivered from the synaptic circuit 220 to the membrane capacitor MC. In this case, the electric charge or current may be delivered while the voltage of the parasitic capacitor PC matches the voltage of the membrane capacitor MC.

The voltage of the membrane capacitor MC may increase in the fire section (t10 to t11) of the main spike signal. For example, in the fire section (t10 to t11) of the main spike signal, the operation signal delivered from the synaptic circuit 220 via the switch SW may be accumulated in the membrane capacitor MC. That is, according to an embodiment of the present disclosure, in a state where the effect on the parasitic capacitor PC is minimized, the operation signal of the membrane capacitor MC may be accumulated. Accordingly, an SNN circuit having minimal influence on the parasitic capacitor PC may be provided.

Hereinafter, FIGS. 11 to 14 illustrate that an SNN circuit according to an embodiment of the present disclosure is implemented, in detail. For descriptive convenience, an SNN circuit is implemented through a PMOS transistor or an re-channel metal-oxide-semiconductor field-effect transistor (NMOS transistor) with reference to the drawings below. However, the scope of the present disclosure is not limited thereto. For example, the scope of the present disclosure may include various embodiments capable of implementing potential correction.

Figure 11:
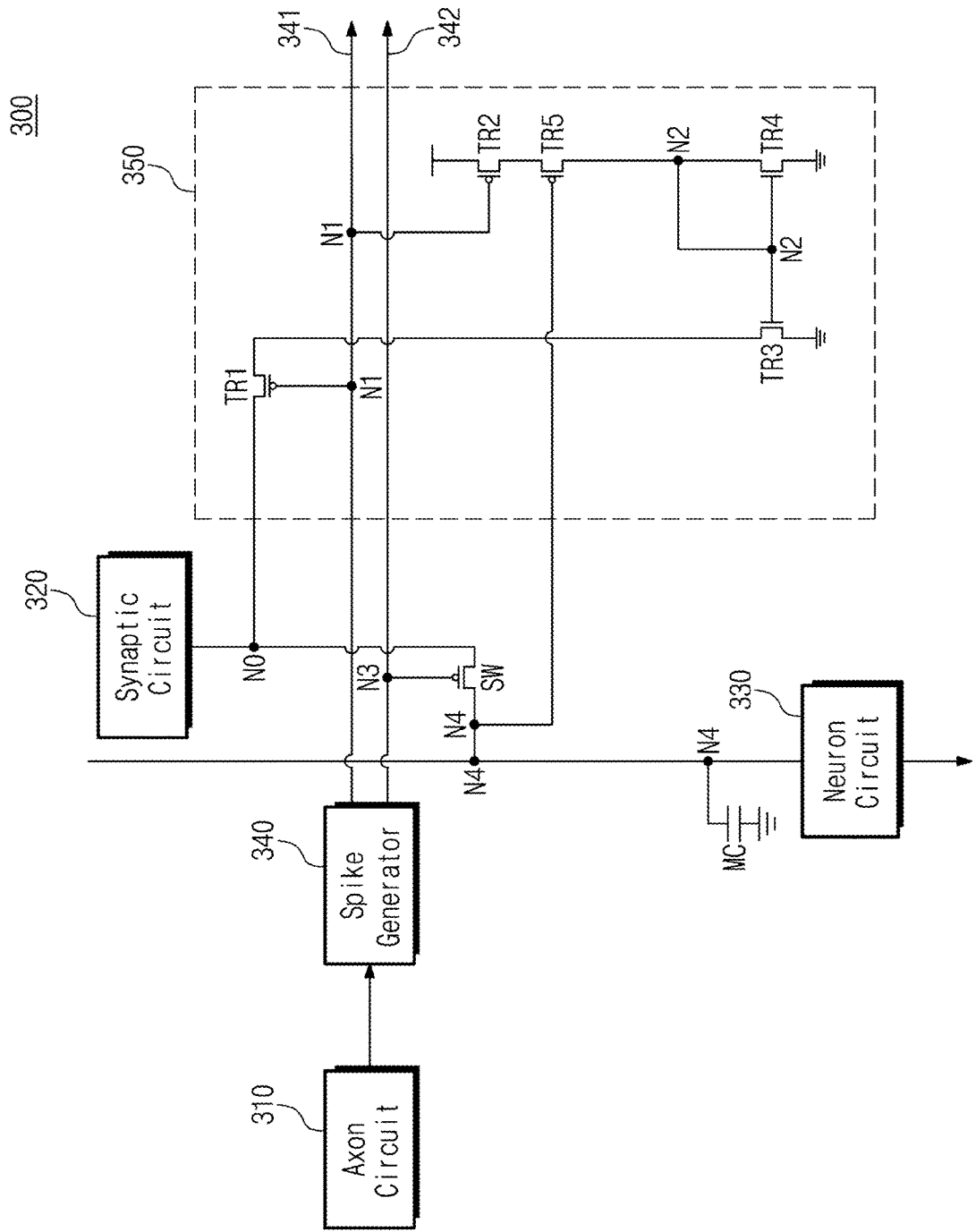
FIG. 11 is an embodiment of an SNN circuit in which the potential correction circuit of FIG. 6 is implemented.

FIG. 11 is an embodiment of an SNN in which the potential correction circuit of FIG. 6 is implemented, in detail. For descriptive convenience, it is assumed that only the potential of a parasitic capacitance is higher than the potential of a membrane capacitor. However, the scope of the present disclosure is not limited thereto.

Referring to FIG. 11, an SNN circuit 300 may include an axon circuit 310, a synaptic circuit 320, a neuron circuit 330, and the membrane capacitor MC and may further include a spike generator 340 and a potential correction circuit 350. The axon circuit 310, the synaptic circuit 320, the neuron circuit 330, the membrane capacitor MC, and the spike generator 340 may perform functions the same as or similar to those of the axon circuit 210, the synaptic circuit 220, the neuron circuit 230, the membrane capacitor MC, and the spike generator 240 of FIG. 6 or 8, and thus a detailed description thereof will be omitted to avoid redundancy. The switch SW of an SNN circuit 300 may perform the same operation and function as the switch SW described with reference to FIG. 3 but may be described as a component that is present outside the synaptic circuit 320 for descriptive convenience.

The potential correction circuit 350 may be implemented by a combination of a plurality of PMOS transistors (e.g., TR1, TR2, and TR5) and/or a plurality of NMOS transistors (e.g., TR3 and TR4). However, the scope of the present disclosure is not limited thereto, and may be variously implemented depending on a method of implementing the spike generator 340 or the switch SW.

Continuing to refer to FIG. 11, the potential correction circuit 350 may include a first transistor TR1. A gate terminal of the first transistor TR1 may be connected to the sub-spike signal line 341 through a first node N1. A source terminal of the first transistor TR1 may be connected to the parasitic capacitor PC or the synaptic circuit 320 through a 0-th node NO. In this case, in the fire section of the sub-spike signal received from the sub-spike signal line 341, the first transistor TR1 may deliver the voltage of the parasitic capacitor PC to the potential correction circuit 350.

The potential correction circuit 350 may include a second transistor TR2. A gate terminal of the second transistor TR2 may be connected to the sub-spike signal line 341 through the first node N1. A source terminal of the second transistor TR2 may receive bias power. In this case, in the fire section of the sub-spike signal received from the sub-spike signal line 341, the potential correction circuit 350 may operate.

The potential correction circuit 350 may include a third transistor TR3 and a fourth transistor TR4. Gate terminals of the third transistor TR3 and the fourth transistor TR4 may be connected to each other through a second node N2. Source terminals of the third transistor TR3 and the fourth transistor TR4 may be grounded. A drain terminal of the third transistor TR3 may be connected to a drain terminal of the first transistor TR1. A drain terminal of the fourth transistor TR4 may be directly connected to the gate terminal of the fourth transistor TR4 through the second node N2.

The potential correction circuit 350 may include a fifth transistor TR5. A gate terminal of the fifth transistor TR5 may be connected to the membrane capacitor MC, the neuron circuit 330 and a drain terminal of the switch SW through a fourth node N4. A source terminal of the fifth transistor TR5 may be connected to the drain terminal of the second transistor TR2, and a drain terminal of the fifth transistor TR5 may be connected to the second node N2.

When the voltage of the parasitic capacitor PC or the output terminal voltage of the synaptic circuit is greater than the voltage of the membrane capacitor MC, the potential correction circuit 350 may correct the potential such that the voltage of the parasitic capacitor PC matches the voltage of the membrane capacitor MC, by reducing the voltage of the parasitic capacitor PC. In this case, the over-charge of the membrane capacitor MC due to the parasitic capacitor PC may be prevented. In the meantime, an embodiment of a potential correction circuit applicable even when the voltage of the parasitic capacitor PC is smaller than the voltage of the membrane capacitor MC will be described in detail with reference to the drawings below.

Figure 12:
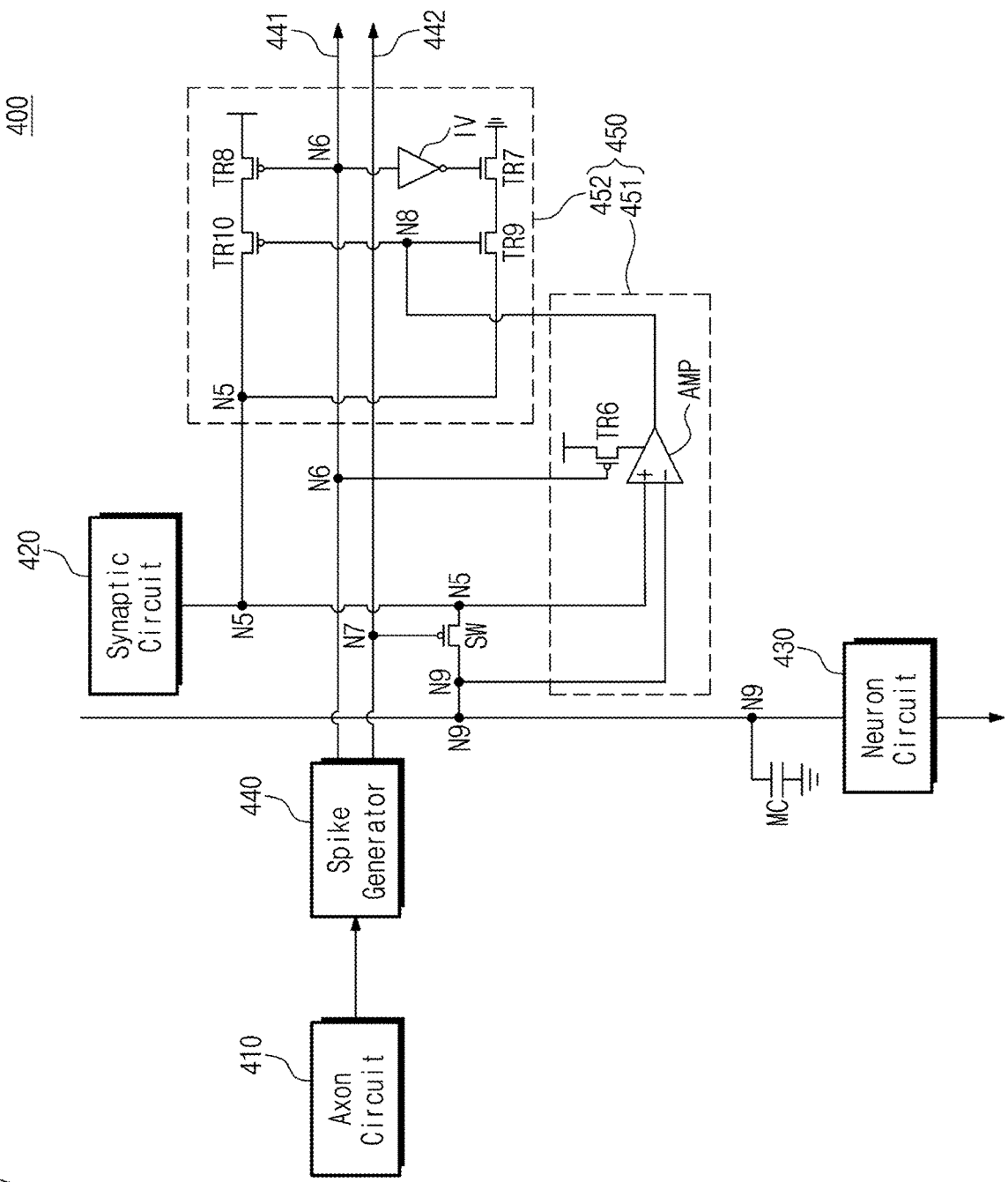
FIG. 12 is an embodiment of an SNN circuit in which the potential correction circuit of FIG. 6 is implemented.

FIG. 12 illustrates an embodiment of an SNN in which the potential correction circuit of FIG. 6 is implemented in detail. Referring to FIG. 12, an SNN circuit 400 may include an axon circuit 410, a synaptic circuit 420, a neuron circuit 430, and a membrane capacitor MC and may further include a spike generator 440 and a potential correction circuit 450.

The potential correction circuit 450 may include an amplifier 451 and a feedback unit 452. The amplifier 451 may include the operational amplifier AMP and a transistor TR6, and the feedback unit 452 may include the inverter IV and a plurality of transistors TR7 to TR10.

The potential correction circuit 450 may be implemented by a combination of a plurality of PMOS transistors (e.g., TR6, TR8, and TR10) and/or a plurality of NMOS transistors (e.g., TR7 and TR9). However, the scope of the present disclosure is not limited thereto, and may be variously implemented depending on a method of implementing the spike generator 440 or the switch SW.

The axon circuit 410, the synaptic circuit 420, the neuron circuit 430, the membrane capacitor MC, and the spike generator 440 may perform functions the same as or similar to those of the axon circuit 210, the synaptic circuit 220, the neuron circuit 230, the membrane capacitor MC, and the spike generator 240 of FIG. 6 or 8, and thus a detailed description thereof will be omitted to avoid redundancy. The switch SW of an SNN may perform the same operation and function as the switch SW described with reference to FIG. 3 but may be described as a component that is present outside the synaptic circuit 420 for descriptive convenience.

Continuing to refer to FIG. 12, the amplifier 451 may include the operational amplifier AMP. In the amplifier 451, a first input terminal (or an inverted input terminal) of the operational amplifier AMP may be connected to the drain terminal of the switch SW, the neuron circuit 430, and the membrane capacitor MC through a ninth node N9, and a second input terminal (or a non-inverting input terminal) of the operational amplifier AMP may be connected to the synaptic circuit 420 through a fifth node N5. In this case, the amplifier 451 may amplify a voltage difference between the membrane capacitor MC and the parasitic capacitor PC.

In an embodiment, a power supply terminal of the operational amplifier AMP may be connected to a sub-spike signal line 441. For example, the sub-spike signal line 441 may be connected to the power supply terminal of the operational amplifier through a switch implemented by the sixth transistor TR6. A source terminal of the sixth transistor TR6 may receive bias power; a gate terminal of the sixth transistor TR6 may be connected to the sub-spike signal line 441 through a sixth node N6; and, a drain terminal of the sixth transistor TR6 may be connected to the power supply terminal of the operational amplifier AMP. In this case, the amplifier 451 may operate in only the fire section of a sub-spike signal.

In the meantime, an output of the operational amplifier AMP amplified through the amplifier 451 or a voltage difference between the membrane capacitor MC and the parasitic capacitor PC may be delivered to the feedback unit 452 through an eighth node N8.

The feedback unit 452 may control a voltage of the parasitic capacitor PC based on the amplified voltage difference received from the amplifier 451. For example, the feedback unit 452 may be connected to the amplifier 451 and the synaptic circuit 420. Referring to FIG. 12, the feedback unit 452 may include a first transistor string (TR7, TR9), in which transistors are connected in series, and a second transistor string (TR8, TR10), in which transistors are connected in series.

The first transistor string (TR7, TR9) may be connected to the synaptic circuit 420 and the amplifier 451 through the fifth node N5. The first transistor string (TR7, TR9) may receive a sub-spike signal through the sixth node N6, and may receive the amplified voltage difference between the membrane capacitor MC and the parasitic capacitor PC through the eighth node N8. For example, a gate terminal of the seventh transistor TR7 may be connected to the sub-spike signal line 441 through the sixth node N6. A source terminal of the seventh transistor TR7 may be grounded, and a drain terminal of the seventh transistor TR7 may be connected to the source terminal of the ninth transistor TR9. Moreover, a gate terminal of the ninth transistor TR9 may be connected to the amplifier 451 through the eighth node N8, and a drain terminal of the ninth transistor TR9 may be connected to the synaptic circuit and the second input terminal (a non-inverting input terminal) of the operational amplifier AMP of the amplifier 451 through the fifth node N5.

In an embodiment, the inverter IV may be further included between the sixth node N6 and the gate terminal of the seventh transistor TR7. The inverter IV may invert a sub-spike signal. In this case, in the fire section of the sub-spike signal, the first transistor string may operate.

The second transistor string (TR8, TR10) may be connected to the synaptic circuit 420 and the amplifier 451 through the fifth node N5. The second transistor string (TR8, TR10) may receive a sub-spike signal through the sixth node N6, and may receive the amplified voltage difference between the membrane capacitor MC and the parasitic capacitor PC through the eighth node N8. For example, a gate terminal of the eighth transistor TR8 may be connected to the sub-spike signal line 441 through the sixth node N6. A source terminal of the eighth transistor TR8 may receive bias power, and a drain terminal of the eighth transistor TR8 may be connected to a source terminal of the tenth transistor TR10. Moreover, a gate terminal of the tenth transistor TR10 may be connected to the amplifier 451 through the eighth node N8, and a drain terminal of the tenth transistor TR10 may be connected to the synaptic circuit and the second input terminal (a non-inverting input terminal) of the operational amplifier AMP of the amplifier 451 through the fifth node N5.

When the output terminal voltage of the synaptic circuit 420 or the voltage of the parasitic capacitor PC is greater than the voltage of the membrane capacitor MC, a feedback is made through the first transistor string (TR7, TR9) such that the voltage of the parasitic capacitor PC decreases. Moreover, when the output terminal voltage of the synaptic circuit 420 or the voltage of the parasitic capacitor PC is smaller than the voltage of the membrane capacitor MC, a feedback is made through the second transistor string (TR8, TR10) such that the voltage of the parasitic capacitor PC increases. Accordingly, after voltages of the parasitic capacitor PC and the membrane capacitor MC are controlled to be the same as each other, the fire section of the main spike signal may be reached. In this case, the SNN circuit having minimal influence of the parasitic capacitor PC (or parasitic capacitance) is provided.

In an embodiment, the amplifier 451 of the SNN circuit 400 may be implemented with a plurality of transistors. Hereinafter, a detailed embodiment of an SNN circuit in which an amplifier is implemented with a plurality of transistors will be described with reference to FIG. 13.

Figure 13:
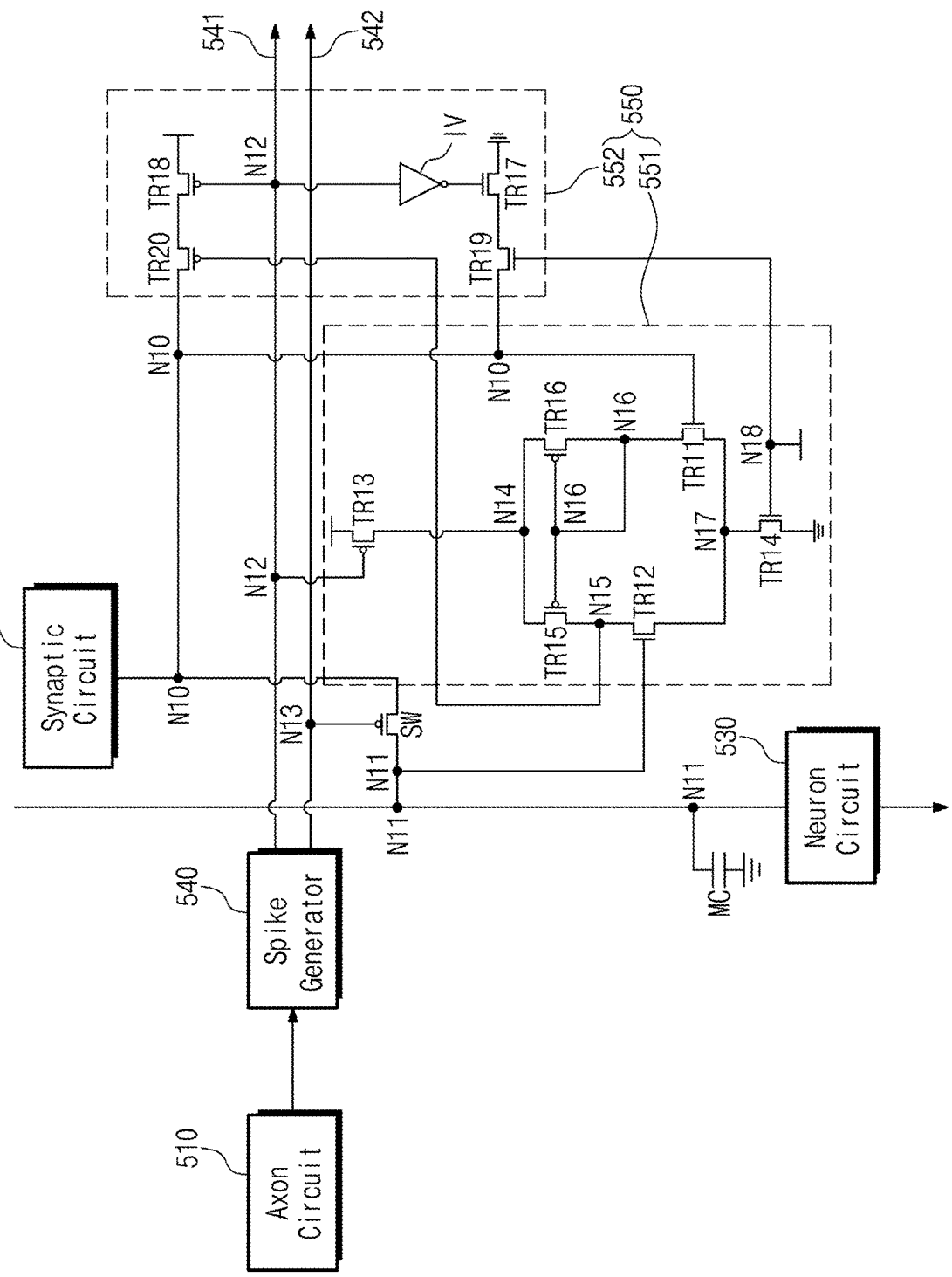
FIG. 13 illustrates an SNN circuit in which the amplifier of FIG. 12 is implemented with a plurality of transistors.

FIG. 13 illustrates an embodiment in which the amplifier of FIG. 12 is implemented with a plurality of transistors. Referring to FIG. 13, an SNN circuit 500 may include an axon circuit 510, a synaptic circuit 520, a neuron circuit 530, and the membrane capacitor MC and may further include a spike generator 540 and a potential correction circuit 550.

The potential correction circuit 550 may include an amplifier 551 and a feedback unit 552, which are implemented with a plurality of transistors TR11 to TR20. The potential correction circuit 550 may be implemented by a combination of a plurality of PMOS transistors (e.g., TR13, TR15, TR16, TR18, and TR20) and/or a plurality of NMOS transistors (e.g., TR11, TR12, TR14, TR17, and TR19). However, the scope of the present disclosure is not limited thereto, and may be variously implemented depending on a method of implementing the spike generator 540 or the switch SW.

The axon circuit 510, the synaptic circuit 520, the neuron circuit 530, the membrane capacitor MC, and the spike generator 540 may perform functions the same as or similar to those of the axon circuit 210, the synaptic circuit 220, the neuron circuit 230, the membrane capacitor MC, and the spike generator 240 of FIG. 6 or 8, and thus a detailed description thereof will be omitted to avoid redundancy. The switch SW of an SNN circuit 500 may perform the same operation and function as the switch SW described with reference to FIG. 3 but may be described as a component that is present outside the synaptic circuit 520 for descriptive convenience.

Continuing to refer to FIG. 13, the amplifier 551 may include eleventh and twelfth transistors TR11 and TR12. A gate terminal of the eleventh transistor TR11 may be connected to the synaptic circuit 520 and a source terminal of the switch SW through a tenth node N10, and a gate terminal of the twelfth transistor TR12 may be connected to a drain terminal of the switch SW and the membrane capacitor MC through an eleventh node N11. Source terminals of the eleventh transistor TR11 and the twelfth transistor TR12 may be connected to each other through a seventeenth node N17. A drain terminal of the eleventh transistor TR11 may be connected to a sixteenth node N16, and a drain terminal of the twelfth transistor TR12 may be connected to a fifteenth node N15. Similarly to the first and second input terminals of the operational amplifier AMP of FIG. 12, the eleventh and twelfth transistors TR11 and TR12 may receive a voltage of the parasitic capacitor PC and the membrane capacitor MC.

The amplifier 551 may include a thirteenth transistor TR13. A gate terminal of the thirteenth transistor TR13 may be connected to a twelfth node N12. A source terminal of the thirteenth transistor TR13 may receive bias power. A drain terminal of the thirteenth transistor TR13 may be connected to a fourteenth node N14. In this case, in the fire section of the sub-spike signal received from a sub-spike signal line 541, power may be supplied to the amplifier 551.

The amplifier 551 may include a fourteenth transistor TR14. A gate terminal of the fourteenth transistor TR14 may be connected to an eighteenth node N18 connected to a bias power supply. A source terminal of the fourteenth transistor TR14 may be grounded. A drain terminal of the fourteenth transistor TR14 may be connected to the source terminals of the eleventh and twelfth transistors TR11 and TR12 through the seventeenth node N17.

The amplifier 551 may include a fifteenth transistor TR15 and a sixteenth transistor TR16. Source terminals of the fifteenth transistor TR15 and the sixteenth transistor TR16 may be connected to the drain terminal of the thirteenth transistor TR13 through the fourteenth node N14. Gate terminals of the fifteenth transistor TR15 and the sixteenth transistor TR16 may be connected to each other through the sixteenth node N16, and may be connected to the drain terminal of the eleventh transistor TR11. A drain terminal of the fifteenth transistor TR15 may be connected to the drain terminal of the twelfth transistor TR12 through the fifteenth node N15. A drain terminal of the sixteenth transistor TR16 may be connected to the drain terminal of the eleventh transistor TR11 and the sixteenth node N16.

The amplifier 551 may be connected to the feedback unit 552 through the tenth node N10, the fifteenth node N15, and the eighteenth node N18. In this case, the amplifier 551 may perform a function similar to that of the amplifier 451 of FIG. 12. For example, the amplifier 551 may perform a function similar to that of a differential amplifier circuit.

The feedback unit 552 may control a voltage of the parasitic capacitor PC based on the amplified voltage difference received from the amplifier 551. For example, the feedback unit 552 may be connected to the amplifier 551 and the synaptic circuit 520. Referring to FIG. 13, the feedback unit 552 may include a third transistor string (TR17, TR19), in which transistors are connected in series, and a fourth transistor string (TR18, TR20), in which transistors are connected in series.

The third transistor string (TR17, TR19) may be connected to the synaptic circuit 520 and the amplifier 551 through the tenth node N10. The third transistor string (TR17, TR19) may receive a sub-spike signal through the twelfth node N12 and may receive the amplified voltage difference between the membrane capacitor MC and the parasitic capacitor PC through the eighteenth node N18. For example, a gate terminal of the seventeenth transistor TR17 may be connected to the sub-spike signal line 541 through the twelfth node N12. A source terminal of the seventeenth transistor TR17 may be grounded, and a drain terminal of the seventeenth transistor TR17 may be connected to a source terminal of the nineteenth transistor TR19. Moreover, a gate terminal of the nineteenth transistor TR19 may be connected to the amplifier 551 through the eighteenth node N18, and a drain terminal of the nineteenth transistor TR19 may be connected to the synaptic circuit and the amplifier 551 through the tenth node N10.

In an embodiment, the inverter IV may be further included between the gate terminal of the seventeenth transistor TR17 and the twelfth node N12. The inverter IV may invert a sub-spike signal.

The fourth transistor string (TR18, TR20) may be connected to the synaptic circuit 520 and the amplifier 551 through the tenth node N10. The fourth transistor string (TR18, TR20) may receive a sub-spike signal through the twelfth node N12, and may receive the amplified voltage difference between the membrane capacitor MC and the parasitic capacitor PC through the tenth node N10. For example, a gate terminal of the eighteenth transistor TR18 may be connected to the sub-spike signal line 541 through the twelfth node N12. A source terminal of the eighteenth transistor TR18 may receive bias power, and a drain terminal of the eighteenth transistor TR18 may be connected to a source terminal of the 20th transistor TR20. Moreover, a gate terminal of the 20th transistor TR20 may be connected to the amplifier 551 through the fifteenth node N15, and a drain terminal of the 20th transistor TR20 may be connected to the synaptic circuit and the amplifier 551 through the tenth node N10.

When the voltage of the parasitic capacitor PC is greater than the voltage of the membrane capacitor MC, a feedback is made through the third transistor string (TR17, TR19) such that the voltage of the parasitic capacitor PC decreases. Moreover, when the voltage of the parasitic capacitor PC is smaller than the voltage of the membrane capacitor MC, a feedback is made through the fourth transistor string (TR18, TR20) such that the voltage of the parasitic capacitor PC increases. Accordingly, in a state where voltages of the parasitic capacitor PC and the membrane capacitor MC are controlled to be the same as each other, the fire section of the main spike signal may be reached. In this case, the SNN circuit 500 having minimal influence of the parasitic capacitor PC (or parasitic capacitance) may be provided.

Figure 14:
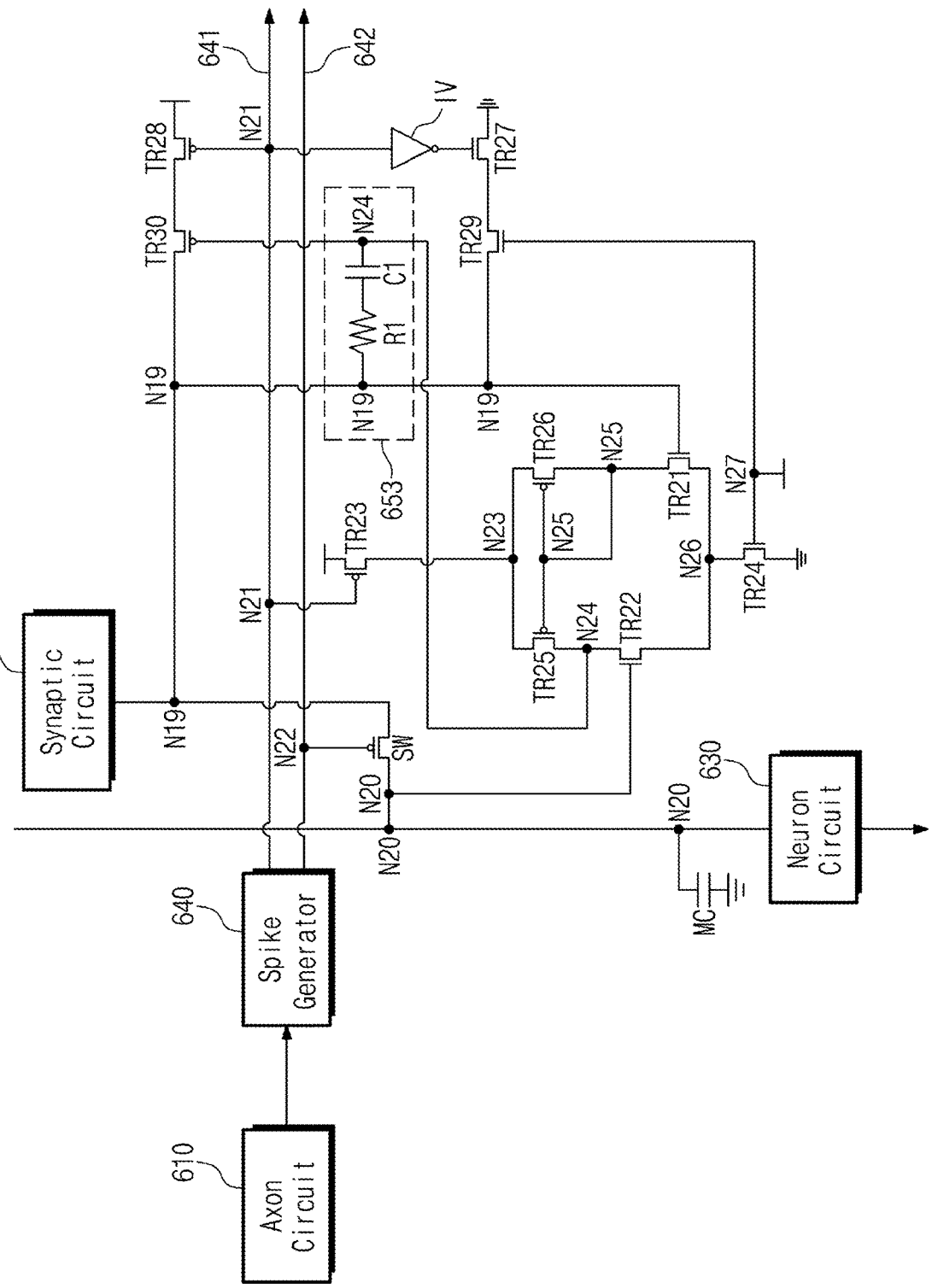
FIG. 14 shows an embodiment in which an oscillation prevention circuit is further included in the potential correction circuit of FIG. 13.

FIG. 14 shows an embodiment in which an oscillation prevention circuit is further included in the potential correction circuit of FIG. 13. Referring to FIG. 14, an SNN circuit 600 may include an axon circuit 610, a synaptic circuit 620, a neuron circuit 630, and the membrane capacitor MC and may further include a spike generator 640 and a potential correction circuit. The potential correction circuit may include an amplifier and a feedback unit, and an oscillation prevention circuit 653 may be further included between the amplifier and the feedback unit.

The axon circuit 610, the synaptic circuit 620, the neuron circuit 630, the membrane capacitor MC, and the spike generator 640 may perform functions the same as or similar to those of the axon circuit 510, the synaptic circuit 520, the neuron circuit 530, the membrane capacitor MC, and the spike generator 540 of FIG. 13, and thus a detailed description thereof will be omitted to avoid redundancy. The switch SW of an SNN circuit 600 may perform the same operation and function as the switch SW described with reference to FIG. 3 but may be described as a component that is present outside the synaptic circuit 620 for descriptive convenience.

21st to 30th transistors TR21 to TR30, and nineteenth to 27th nodes N19 to N27 respectively perform the same connection relationship and/or function as the eleventh to 20th transistors TR11 to TR20 of FIG. 13, and tenth to eighteenth nodes N10 to N18, and thus a detailed description thereof will be omitted to avoid redundancy.

Continuing to refer to FIG. 14, the oscillation prevention circuit 653 may be further included in the potential correction circuit 550 of FIG. 13. For example, the oscillation prevention circuit 653 in which a resistor R1 and a capacitor C1 are connected in series may be further included between a nineteenth node N19 and a 24th node N24. In this case, output oscillation caused by an instantaneous change in a sub-spike signal may be prevented. However, the scope of the present disclosure is not limited thereto and may include a spiral neural network circuit including an oscillation prevention circuit in which circuit elements such as resistors, capacitors, and inductors are implemented through a series, a parallel, and/or a combination thereof.

The above description refers to detailed embodiments for carrying out the invention. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, an SNN circuit in which an operation error due to parasitic capacitance is minimized is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A spike neural network (SNN) circuit comprising:
   a spike generator configured to receive an input spike signal and to convert the input spike signal into a sub-spike signal and a main spike signal;
   a synaptic circuit configured to generate an operation signal based on a weight and to output the operation signal in response to the main spike signal;
   a membrane capacitor configured to accumulate the operation signal; and
   a potential correction circuit configured to correct an output terminal voltage of the synaptic circuit based on a voltage of the membrane capacitor in response to the sub-spike signal.

2. The SNN circuit of claim 1, further comprising:
   a transistor including a gate terminal that receives the main spike signal, a source terminal connected to the synaptic circuit and the potential correction circuit, and a drain terminal connected to the membrane capacitor and the potential correction circuit.

3. The SNN circuit of claim 2, wherein, in a fire section of the main spike signal, the transistor delivers the operation signal to the membrane capacitor, and
   wherein, when a current section is not the fire section of the main spike signal, the transistor does not deliver the operation signal to the membrane capacitor.

4. The SNN circuit of claim 1, wherein, in a fire section of the sub-spike signal, the output terminal voltage of the synaptic circuit is controlled by the potential correction circuit to have a level the same as the voltage of the membrane capacitor.

5. The SNN circuit of claim 1, wherein the spike generator includes:
   a first NAND gate configured to output the sub-spike signal based on a first signal identical to the input spike signal, and a second signal obtained by inverting and delaying the first signal; and a second NAND gate configured to output the main spike signal based on the first signal and a third signal obtained by inverting the second signal.

6. The SNN circuit of claim 1, wherein the synaptic circuit includes:
a binary memory configured to store the weight; and
a current-mode digital-to-analog converter (C-DAC) configured to generate the operation signal corresponding to the weight stored in the binary memory.

7. The SNN circuit of claim 1, wherein the potential correction circuit further includes an oscillation prevention capacitor.

8. The SNN circuit of claim 1, further comprising:
a neuron circuit configured to fire when the membrane capacitor is charged to have a voltage that is not smaller than a threshold voltage.

9. The SNN circuit of claim 8, wherein the neuron circuit outputs a spike signal to another SNN circuit.

10. The SNN circuit of claim 1, further comprising:
a neuron circuit configured to fire when the membrane capacitor is discharged to have a voltage that is not greater than a threshold voltage.

11. The SNN circuit of claim 10, wherein the neuron circuit outputs a spike signal to another SNN circuit.

12. An operating method of an SNN circuit, the method comprising:
converting an input spike signal into a sub-spike signal and a main spike signal to correct a potential;
matching an output terminal voltage of a synaptic circuit based on a voltage of a membrane capacitor in a fire section of the sub-spike signal;
delivering an operation signal to the membrane capacitor in a fire section of the main spike signal; and
accumulating the operation signal in the membrane capacitor.

13. The method of claim 12, further comprising:
firing, by a neuron circuit, when the voltage of the membrane capacitor is greater than a threshold voltage.

14. The method of claim 12, further comprising:
firing, by a neuron circuit, when the voltage of the membrane capacitor is smaller than a threshold voltage.

15. The method of claim 12, wherein the converting of the input spike signal into the sub-spike signal and the main spike signal includes:
outputting the sub-spike signal by inputting a first signal, which is identical to the input spike signal, and a second signal, which is obtained by inverting and delaying the first signal, into a first NAND gate; and
outputting the main spike signal by inputting the first signal and a third signal, which is obtained by inverting the second signal, into a second NAND gate.

* * * * *